United States Patent
Mashima et al.

(10) Patent No.: US 7,519,283 B2
(45) Date of Patent: Apr. 14, 2009

(54) BARREL UNIT, IMAGE PICKUP APPARATUS INSTALLED WITH THE SAME, AND METHOD FOR CORRECTING SHAKE OF BARREL

(75) Inventors: Hiroshi Mashima, Sakai (JP); Tomohiro Matsumoto, Sakai (JP); Kazuhiro Shibatani, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 332 days.

(21) Appl. No.: 11/358,290

(22) Filed: Feb. 21, 2006

(65) Prior Publication Data

US 2006/0285838 A1   Dec. 21, 2006

(30) Foreign Application Priority Data

Jun. 15, 2005   (JP) .............................. 2005-175553

(51) Int. Cl.
*G03B 17/00* (2006.01)
*H04N 5/228* (2006.01)

(52) U.S. Cl. ................. 396/55; 348/208.99; 348/208.11

(58) Field of Classification Search ................... 396/50, 396/52, 55, 448; 348/208.99, 208.1, 208.2, 348/208.4, 208.5, 208.7, 208.11
See application file for complete search history.

(56) References Cited

U.S. PATENT DOCUMENTS 5,416,558 A    5/1995    Katayama et al.
5,745,800 A    4/1998    Kanbara et al.
5,794,081 A  * 8/1998    Itoh et al. ....................... 396/55
6,686,954 B1 * 2/2004    Kitaguchi et al. ......... 348/208.1
2004/0141065 A1 * 7/2004    Hara et al. ............. 348/208.11
2005/0225646 A1 * 10/2005    Shintani ................ 348/208.99
2006/0127073 A1 *  6/2006    Yasuda ........................ 396/55
2006/0140601 A1 *  6/2006    Mitani et al. .................. 396/55

FOREIGN PATENT DOCUMENTS

| JP | 5107620 | 4/1993 |
| JP | 6148494 | 5/1994 |
| JP | 7072523 | 3/1995 |
| JP | 7274056 | 10/1995 |
| JP | 10142646 | 5/1998 |
| JP | 3270576 | 12/2002 |

* cited by examiner

*Primary Examiner*—Christopher E Mahoney
*Assistant Examiner*—Minh Phan
(74) *Attorney, Agent, or Firm*—Brinks Hofer Gilson & Lione

(57) ABSTRACT

A barrel unit includes a barrel having an image sensing device and a photographing optical system built therein, a supporting member for pivotally supporting the barrel, a steel ball functioning as a pivot bearing portion provided between the barrel and the supporting member, and first and second actuators for giving driving forces to the barrel for shake correction. A gravity point of the barrel is located within an area enclosed by supporting points by first and second acting portions, to which the driving forces from the first and second actuators are given, and the steel ball. The barrel unit can be made more compact and more stably and precisely driven for shake correction.

10 Claims, 16 Drawing Sheets

P-DIRECTION DRIVE

Y.A-DIRECTION DRIVE

BARREL UNIT, IMAGE PICKUP APPARATUS INSTALLED WITH THE SAME, AND METHOD FOR CORRECTING SHAKE OF BARREL

This application is based on patent application No. 2005-175553 filed in Japan, the contents of which are hereby incorporated by references.

BACKGROUND OF THE INVENTION

1. Field of the Invention

The present invention relates to a barrel unit built in an electronic camera, a camera-fitted mobile phone or the like and capable of a shake correction against a camera shake, an image pickup apparatus installed with such a barrel unit and a method for correcting a shake of a barrel.

2. Description of the Related Art

In electronic cameras and the like, various shake correcting mechanisms have been adopted to suppress the disturbance of a photographed image due to the hand shake of a user. A so-called gimbal mechanism for rotatably supporting the entire barrel has been conventionally known as a shake correcting mechanism (see, for example, Japanese Unexamined Patent Publication No. H07-274056). Further, there has been also known a mechanism for shifting a shake correcting lens disposed inside a barrel in such a direction as to cancel out the shake acting on a camera within a plane orthogonal to an optical axis (see, for example, Japanese Unexamined Patent Publication No. H05-107620).

In recent years, the miniaturization of electronic cameras has further advanced and, therefore, a shake correcting mechanism for a photographing optical system incorporated into an originally small digital equipment such as a small-size electronic camera and a camera-fitted mobile phone has been required to have a maximally compact construction. However, it is difficult to make a gimbal mechanism as disclosed in the first publication more compact. Further, the shake correcting lens needs to be miniaturized in the shake correcting mechanism disclosed in the second publication in the case of being installed into a small-size electronic camera or the like. It is difficult to precisely drive such a minute shake correcting lens, which leads to a problem of being difficult to perform a proper shake correction.

On the other hand, the applicant of the present application proposed a shake correcting method according to which an optical system for bending an optical axis of an incident light substantially at 90 degrees is used and supported by means of one steel ball (pivot bearing portion) and two actuators, and a shake correction is performed by rotatably driving the entire barrel about two axes orthogonal to each other. Unlike the above gimbal mechanism, this shake correcting mechanism can be made more compact. However, the shake correcting mechanism is required to be even more compact in order to deal with recent smaller electronic cameras, camera-fitted mobiles and the like.

SUMMARY OF THE INVENTION

It is an object of the present invention to provide a technology which is free from the problems residing in the prior art.

It is another object of the present invention to provide a barrel unit which can stably and precisely drive a barrel for shake correction while pursuing the further miniaturization of a shake correcting mechanism, an image pickup apparatus installed with such a barrel unit and a method for correcting a shake of a barrel.

According to an aspect of the present invention, a barrel unit comprises a barrel provided with a photographing optical system, and a supporting member for pivotally supporting the barrel. The barrel is supported in at least three supporting points, and given driving forces from different positions for shake correction. The gravity point of the barrel is located within an area enclosed by the at least three supporting points.

These and other objects, features, aspects and advantages of the present invention will become more apparent upon a reading of the following detailed description and accompanying drawings.

BRIEF DESCRIPTION OF THE DRAWINGS

FIGS. 8A and 8B are perspective views diagrammatically showing a driven state of a barrel for shake correction in the barrel unit, wherein FIG. 8A shows a case of driving the barrel in pitch direction for shake correction, and FIG. 8B shows a case of driving the barrel in yaw direction for shake correction;

FIGS. 15A and 15B are perspective views showing a driven state of a barrel of the barrel unit of FIG. 13 for shake correction, wherein FIG. 15A shows a case of driving the barrel in pitch direction and FIG. 15B shows a case of driving the barrel in yaw direction;

DETAILED DESCRIPTION OF THE PREFERRED EMBODIMENTS OF THE INVENTION

Hereinafter, specific embodiments of the present invention are described in detail while illustrating an electronic camera having a built-in barrel as one embodiment of an image pickup apparatus provided with a barrel unit.

(Description of the Construction of a Camera)

Figure 1A:
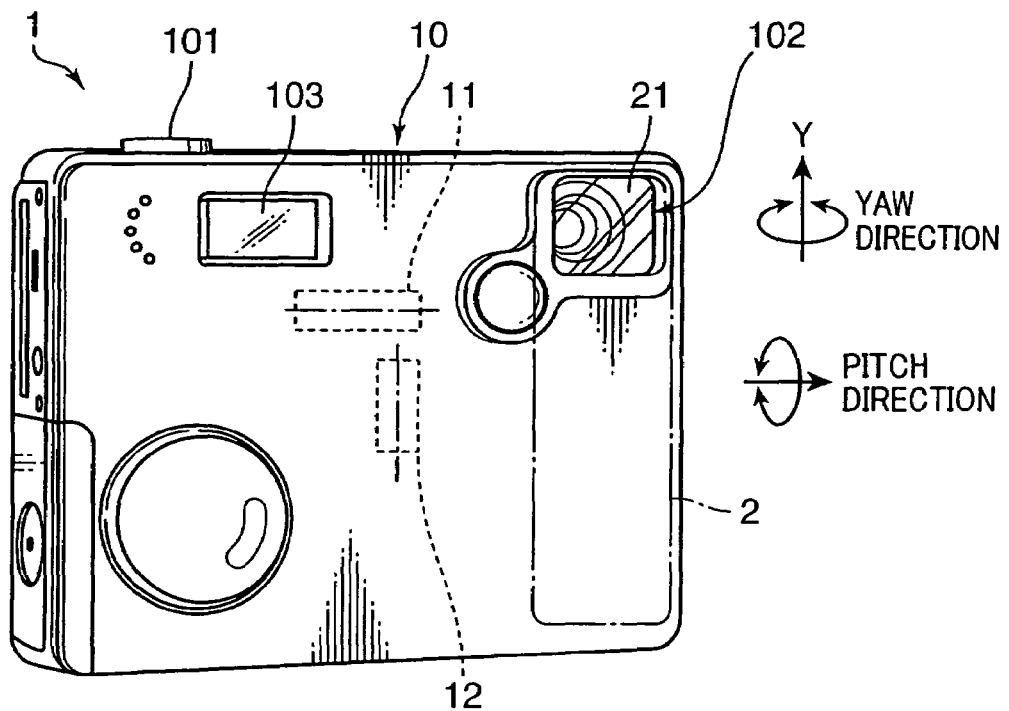
FIG. 1A is a front view showing an external configuration of an electronic camera according to an embodiment of the invention.
Figure 1B:
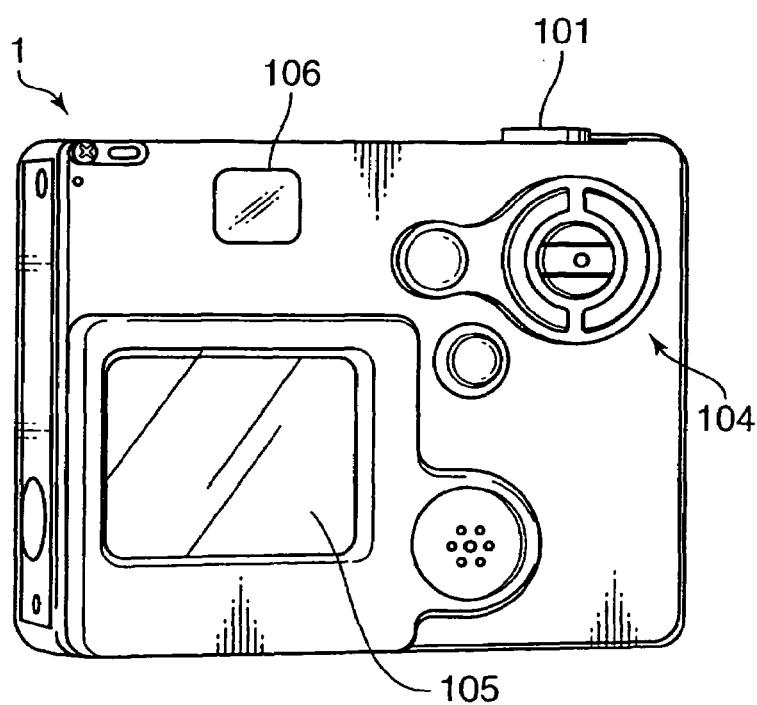
FIG. 1B is a rear view showing the external configuration of the electronic camera.

Referring to FIGS. 1A and 1B showing the external configuration of an electronic camera according to an embodiment of the invention, an electronic camera 1 is provided with a built-in barrel, a release button 101 and the like on the top surface of a camera main body 10; and a photographing window 102, a flash firing portion 103 and the like on the front surface thereof; and various operation buttons 104, a display 105 including a liquid crystal monitor, a viewfinder 106 and the like on the rear surface thereof. A barrel 2 constructing a photographing optical system for receiving a subject image from an objective lens 21 through the photographing window 102 and introducing it to a solid-state image sensing device arranged in the main body 10 is incorporated into the main body 10. The length of the barrel 2 does not change during zooming and focusing, i.e., does not project out from the main body 10, and the solid-state image sensing device is integrally assembled at a side of its image surface. Further, a pitch-direction (P-direction) shake detecting gyroscope 11 and a yaw-direction (Ya-direction) shake detecting gyroscope 12 as shake detecting means for detecting an amount of the shake given to the camera 1 are incorporated into the main body 10. The pitch direction and yaw direction are defined as rotating directions about X-axis and Y-axis, respectively, if the horizontal direction (width direction) and vertical direction (height direction) of the camera 1 are referred to as X-axis direction and Y-axis direction.

Figure 2:
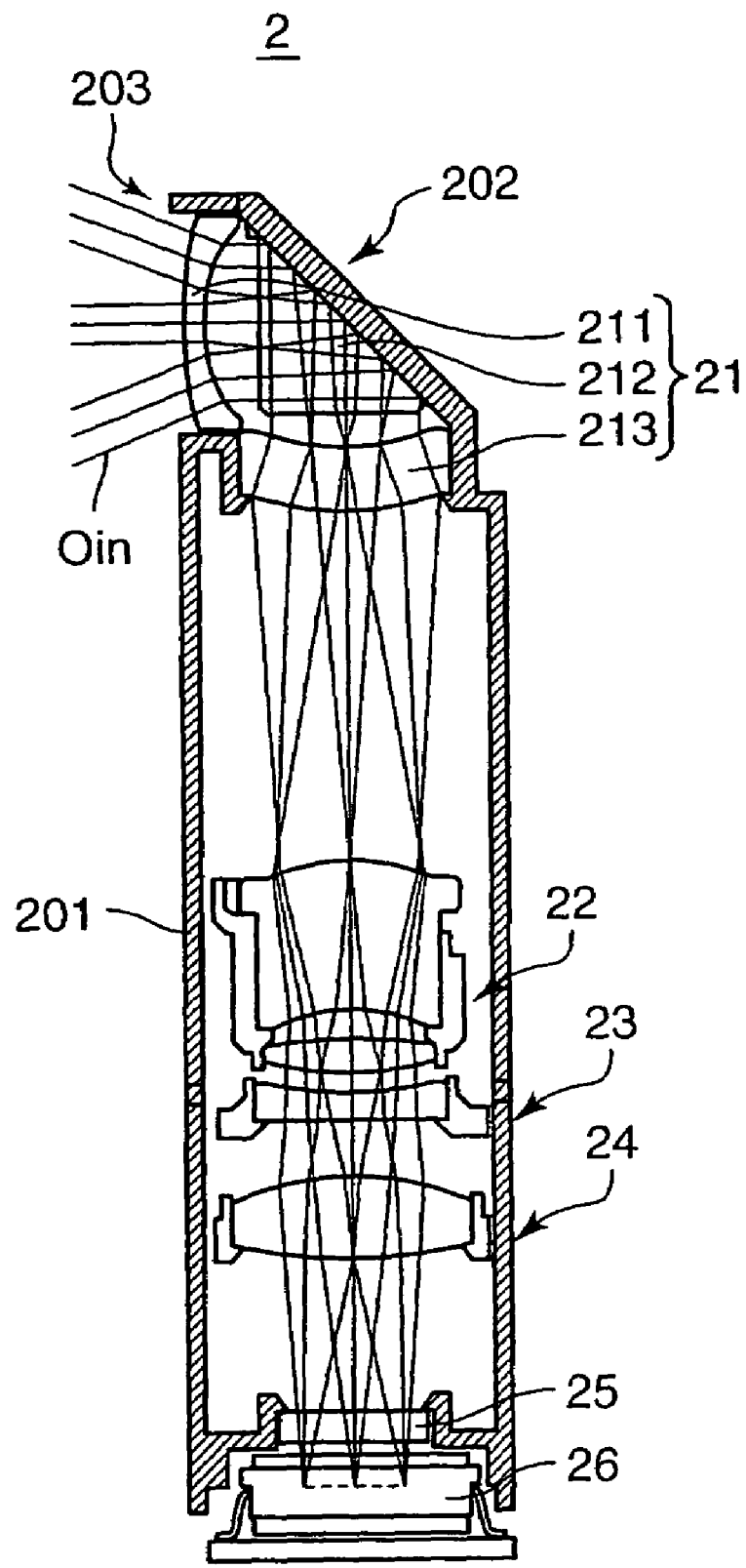
FIG. 2 is a sectional view showing one example of an inter construction of a barrel (in a wide-angle operating state)

FIG. 2 is a sectional view showing one example of the internal construction of the barrel 2 (in a wide-angle operating state). This barrel 2 has a tubular shape that can be vertically or horizontally built in the camera main body 10, and, in its appearance, is comprised of a tubular portion 201 where lens groups are accommodated, and a bent portion 202 arranged in conformity with the position of the photographing window 102 of the camera main body 10 and formed with an aperture 203 for introducing a subject image into the barrel 2.

A first lens 211 fixedly attached to the aperture 203, a prism 212 arranged on the oblique side of the bent portion 202, and an object lens 21 including a second lens 213 arranged at the entrance side of the tubular portion 201 are fixedly disposed in the bent portion 202. A first zoom lens block 22, a fixed lens block 23 and a second zoom lens block 24 are arranged one after another along an optical axis in the tubular portion 201. Further, a solid-state image sensing device 26 such as a CCD is fixed at the exit side of the tubular portion 201 via a low-pass filter 25 for preventing moiré. In other words, when the barrel 2 pivots, the solid-state image sensing device 26 pivots together therewith. Thus, a beam Oin (incident light) of the subject image introduced through the aperture 203 is bent at 90 degrees by the prism 212 of the objective lens 21, and is introduced to a light sensing surface of the solid-state image sensing device 26 by way of the first zoom lens block 22, the fixed lens block 23, the second zoom lens block 24 and the low-pass filter 25.

This barrel 2 is constructed such that driving forces are given thereto for shake correction by a plurality of actuators to be described later while being incorporated in the main body 10. Specifically, if the vibration of the main body 10 is detected by the Pitch-direction shake detecting gyroscope 11 and the Yaw-direction shake detecting gyroscope 12, the barrel 2 receives the action of driving forces from the respective actuators in directions along movement axes of the actuators, and is so driven to pivot (rotate) about specified shake correction control axes (for example, in pitch direction and yaw direction) as to cancel out the shake. The arrangement and the like of the actuators are described in detail later.

Figure 3:
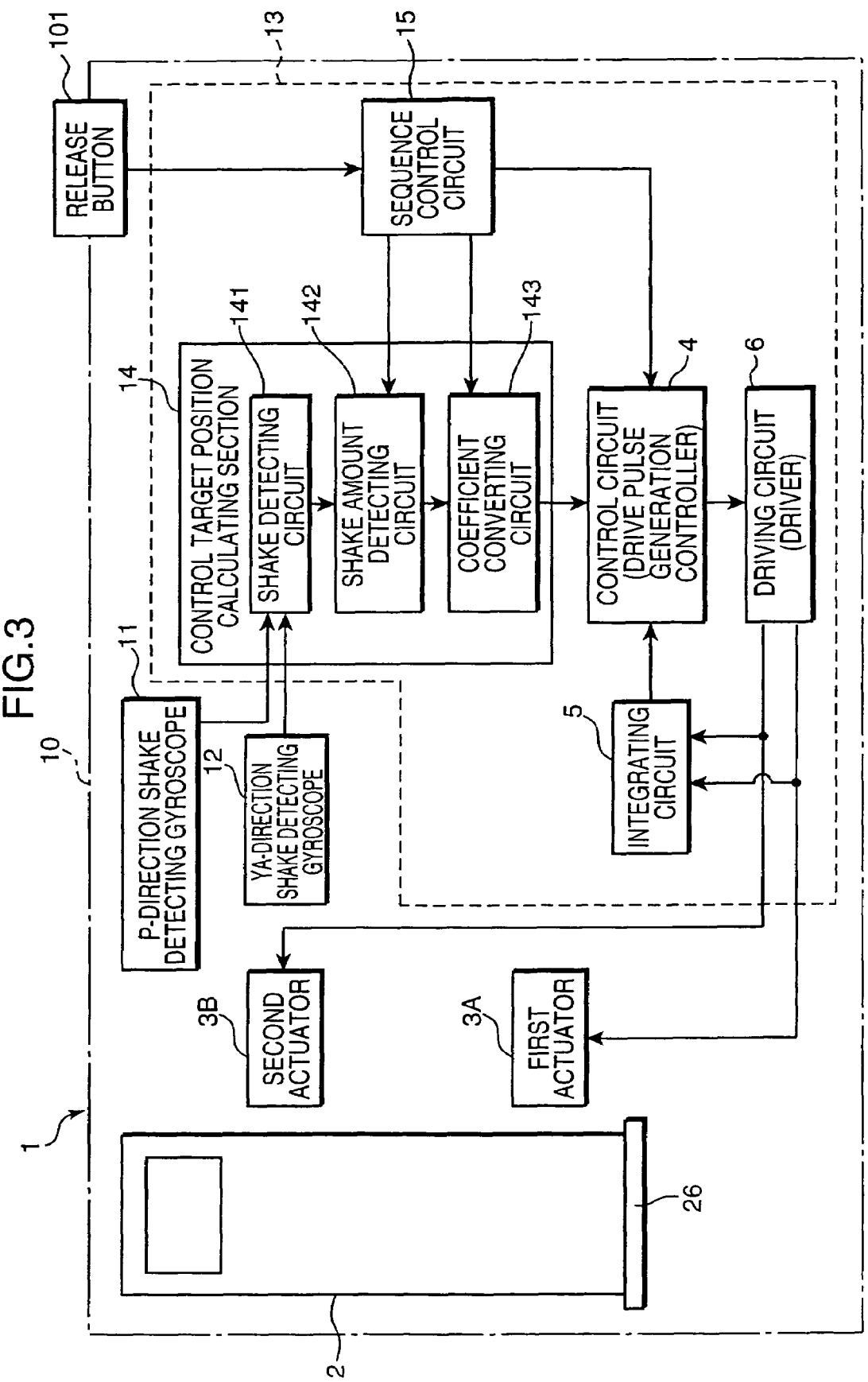
FIG. 3 is a block diagram schematically showing the construction of the electronic camera according to the embodiment only for an essential portion of an electrical construction.

FIG. 3 is a block diagram schematically showing the construction of the electronic camera 1 of this embodiment only for an essential portion of the electrical construction. The main body 10 of this electronic camera 1 is internally provided with the release button 101, the pitch-direction shake detecting gyroscope 11 and the yaw-direction detecting gyroscope 12 as the detecting means for detecting the camera shake or the like acting on the camera 1, a circuit device 13 including various circuit board blocks, the barrel 2 constructing the photographing optical system, and first and second actuators 3A and 3B including stepping motors for driving the barrel 2 for shake correction. The circuit device 13 includes a control target position calculating section 14, a sequence control circuit 15, a control circuit 4, an integrating circuit 5 and a driving circuit 6. In this example, two actuators are used so as to conform to a barrel unit to be described later.

The release button 101 is an operation switch a user presses down upon performing a photographing operation. When this release button 101 is pressed halfway, the camera 1 enters a photographing preparing state. In such a photographing preparing state, an automatic focusing (AF) for automatically bringing a subject into focus, an automatic exposure (AE) for automatically determining exposure values, and a shake correcting function for preventing an image disturbance caused by the camera shake act. In order to facilitate the framing, this shake correcting function continues to act while the release button 101 is being pressed down. Further, when the user fully presses the release button 101 down, photographing is started. In other words, an exposure control is so carried out that the solid-state image sensing device is properly exposed in accordance with an exposed state determined by the AE.

The pitch-direction shake detecting gyroscope 11 is a gyroscopic sensor for detecting the shake of the electronic camera 1 along pitch direction (see FIG. 1). The yaw-direction shake detecting gyroscope 12 is a gyroscopic sensor for detecting the shake of the electronic camera 1 along yaw direction. The gyroscopic sensors used here are for detecting an angular velocity of the shake in the case that a measurement object (camera main body 10 in this embodiment) is rotated by the shake. Such gyroscopic sensors may be constructed such that a voltage is applied, for example, to a piezoelectric device to bring it into an oscillating state, a distortion resulting from a Coriolis force created when an angular velocity by the rotary motion acts on this piezoelectric device is extracted as an electrical signal to detect the angular velocity.

The control target position calculating section 14 generates control target information set in specified sampling cycles. More specifically, the control target position calculating section 14 receives a pitch-direction shake angular velocity signal detected by the pitch-direction shake detecting gyroscope 11 and a yaw-direction shake angular velocity signal detected by the yaw-direction shake detecting gyroscope 12, and sets a control target value for a servo control (in this case, position information of the barrel 2 as an object to be driven). The control target position calculating section 14 includes a shake detecting circuit 141, a shake amount detecting circuit 142 and a coefficient converting circuit 143.

The shake detecting circuit 141 includes processing circuits such as filter circuits (low-pass filter and high-pass filter) for reducing noise and drift from the angular velocity signals detected by the pitch-direction shake detecting gyroscope 11 and the yaw-direction shake detecting gyroscope 12, and an amplifying circuit for amplifying the angular velocity signals.

The angular velocity signals after being processed by these processing circuits are inputted to the shake amount detecting circuit 142.

The shake amount detecting circuit 142 receives the detected angular velocity signals at specified intervals of time and applies integration thereto, whereby these angular velocity signals are outputted to the coefficient converting circuit 143 as an angle signal θx representing a shake amount of the electronic camera 1 in X-axis direction, and an angle signal θy, which is a shake amount of the electronic camera 1 in Y-direction.

The coefficient converting circuit 143 converts the shake amounts (angle signals θx, θy) in the respective directions outputted from the shake amount detecting circuit 142 into movement amounts (px, py) in the respective directions, i.e., movement amounts (target values for positioning) by which the barrel 2 should be moved about the shake correction control axes by means of the first and second actuators 3A, 3B. These target values for positioning are calculated by multiplying angles of rotation (θx, θy) about the respective shake correction control axes (first, second control axes) corresponding to shake detection axes along pitch direction and yaw direction by distances between the first or second control axis to points of application of the first and second actuators 3A, 3B on the barrel 2. Signals representing the movement amounts (px, py) in the respective directions outputted from the coefficient converting circuit 143 are inputted to the control circuit 4.

The control circuit 4 (drive pulse generation controller) controls the generation of drive pulses for driving the first and second actuators 3A, 3B constructed by stepping motors. The control circuit 4 converts the signals representing the movement amounts (px, py) in the respective directions into actual drive pulse signals in view of the position information from the integrating circuit 5 to be described later and the operation characteristics and the like of the first and second actuators 3A, 3B. Specifically, the control circuit 4 functions as calculating means for calculating generation condition for drive pulses necessary to pivot the barrel 2 to reach the control target values in order to carry out a shake correction control (servo control) tracking the control target values generated in the control target position calculating section 14 based on the detection signals from the pitch-direction shake detecting gyroscope 11 and the yaw-direction shake detecting gyroscope 12. The functions of this control circuit 4 are described in detail later.

The integrating circuit 5 is provided for the open-loop control of the first and second actuators 3A, 3B; integrates the number of drive pulses generated by the driving circuit 6; generates current position information of the stepping motors, i.e., the pivoting position information of the barrel 2; and outputs the generated information to the control circuit 4. It should be noted that, in the case of a closed loop control, a position sensor and a converting circuit for replacing the position information by sensing information from the position sensor are incorporated in place of this integrating circuit 5. Of course, a position sensing function may be provided for step-out prevention and centering also in the case of an open loop control.

The driving circuit 6 (driver) includes a pulse generating circuit and the like and generates drive pulses for actually driving the first and second actuators 3A, 3B. These drive pulses are generated in accordance with drive pulse generation control signals given from the control circuit 4.

The operations of the above shake amount detecting circuit 142, coefficient converting circuit 143 and the control circuit 4 are controlled by the sequence control circuit 15. Specifically, when the release button 101 is pressed down, the sequence control circuit 15 controls the shake amount detecting circuit 142 to let it obtain data signals concerning the aforementioned shake amounts (angle signals θx, θy) in the respective directions. Subsequently, the sequence control circuit 15 controls the coefficient converting circuit 143 to let it convert the shake amounts in the respective directions into the movement amounts (px, py) in the respective directions. Consequently, the sequence control circuit 15 controls the control circuit 4 to let it calculate a corrective movement amount of the barrel 2 in specified sampling cycles in accordance with the movement amounts in the respective directions. Such operations are repeated at specified intervals of time for an anti-vibration control of the barrel 2 (camera shake correction) until the release button 101 is fully pressed to end the exposure.

A usual small-size stepping motor including a stator core and a rotor core can be used as the stepping motor constructing the first, second actuator 3A, 3B. It is desirable to directly couple an externally threaded rotary shaft to the rotor core and mount a movable piece (nut or the like) on the externally threaded rotary shaft, so that the barrel 2 can be directly driven in an anti-vibratory manner. Instead of such a rotary stepping motor, a linear stepping motor in which a rotor linearly moves relative to a stator may be used.

Figure 4:
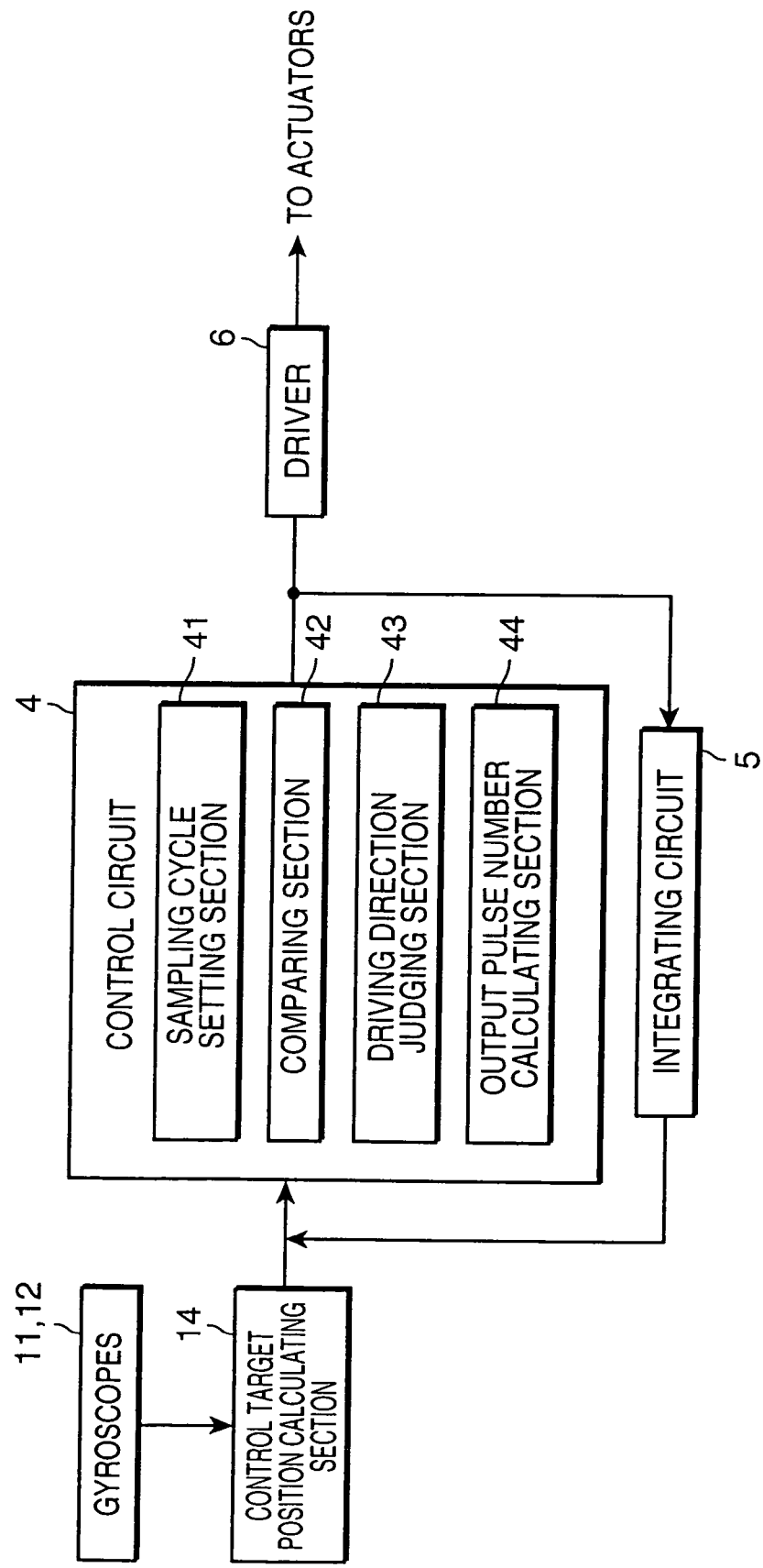
FIG. 4 is a function block diagram showing functions of a control circuit.

FIG. 4 is a function block diagram showing functions of the control circuit 4. The control circuit 4 has a main function of setting the generation condition for drive pulses for driving the first and second actuators 3A, 3B in every specified sampling cycle. The control circuit 4 is provided with a sampling cycle setting section 41, a comparing section 42, a driving direction judging section 43 and an output pulse number calculating section 44.

The sampling cycle setting section 41 receives the setting of the sampling cycle in which the control target values for the servo control are obtained from the control target position calculating section 14. This sampling cycle may be arbitrarily set and can be suitably selected from, for example, a range of about 0.1 ms to about 2 ms. Generally, if the sampling cycle is set to be short, tracking performance is better since the control target values are obtained in shorter cycles. In view of a processing power and the performance of the stepping motors, suitable sampling cycles may be set.

The comparing section 42 compares the current position information of the rotors of the stepping motors (first and second actuators 3A, 3B), i.e., the pivoting position information of the barrel 2, which is represented by an integral value signal outputted from the aforementioned integrating circuit 5, with the obtained target position information, thereby calculating a position deviation "e" between the current position and the target position information. The barrel 2 is pivoted about the respective shake correction control axes by the first and second actuators 3A, 3B such that this position deviation "e" maximally approaches zero.

The driving direction judging section 43 judges the rotating direction of each stepping motor based on whether the position deviation "e" calculated in the comparing section 42 is positive or negative, and also generates a control signal for rotating the rotor in forward or reverse direction by changing an order of power application to a stator coil based on the judgment result on the rotating direction.

The output pulse number calculating section 44 resets the generation condition for driving pulses used thus far in every sampling cycle in accordance with the position deviation "e" calculated in the comparing section 42, and carries out such an operation as to determine the generation condition (numbers of drive pulses) for drive pulses to be generated within a sampling interval. In other words, the output pulse number calculating section 44 calculates the numbers of the drive pulses used to cause the stepping motors to drive the barrel 2 about the respective shake correction control axes based on the movement amounts (px, py) about the shake correction control axes.

Control signals generated by the driving direction judging section 43 and representing the forward or reverse rotation of the rotors, and control signals generated by the output pulse number calculating section 44 and representing the numbers of drive pulses are outputted to the driving circuit 6. Upon receiving such control signals, the driving circuit 6 generates specified drive pulses by means of the pulse generating circuit and gives them to the first actuators 3A, 3B to drive the barrel 2.

Figure 5:
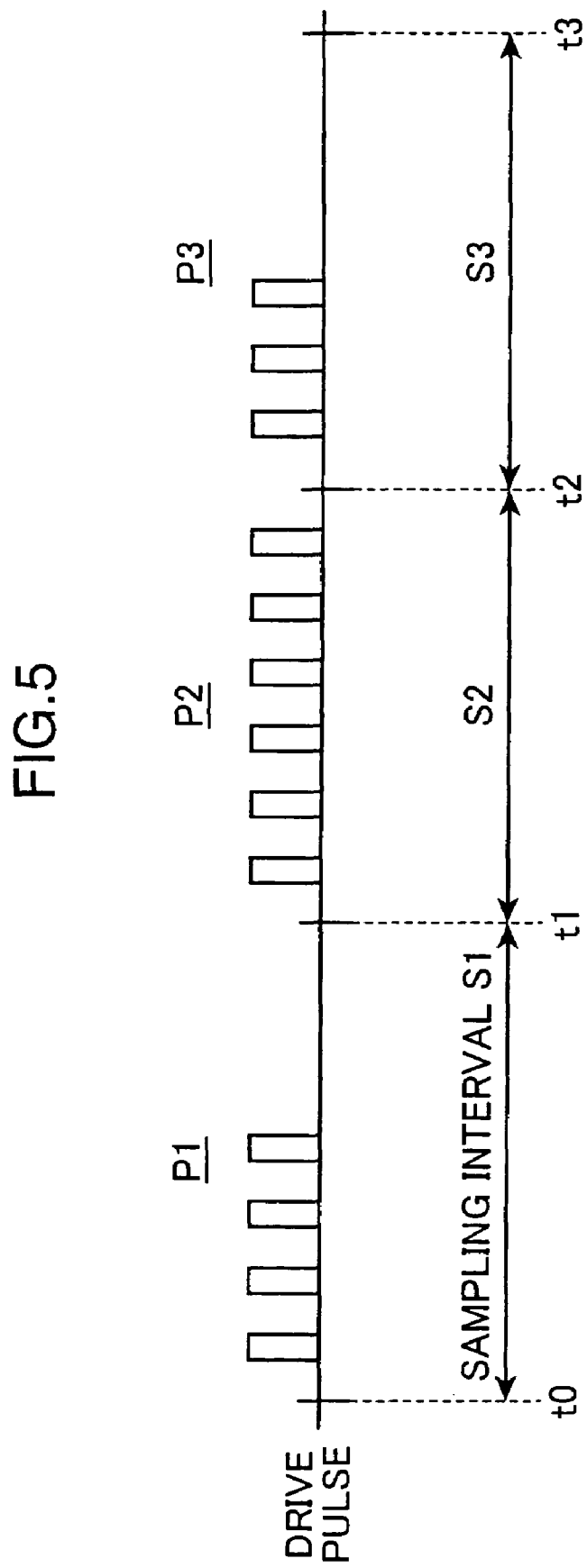
FIG. 5 is a timing chart showing a specific drive pulse generated by the control circuit.

FIG. 5 is a timing chart showing a specific example of drive pulses generated by the control circuit 4. As shown in FIG. 5, drive pulses necessary to drive the barrel 2 for shake correction are outputted at each of specified sampling intervals S1, S2, S3, . . . . The number of the drive pulses to be generated within the sampling interval is determined by a required maximum speed and a positioning resolution. However, a step-out occurs if a drive pulse frequency is extremely high. Thus, such a specified drive pulse frequency as to cause no step-out is selected.

The generation condition for drive pulses is reset in every sampling cycle, and a new generation condition for drive pulses is calculated during each sampling interval. Specifically, if specified drive pulses P1 are outputted during the first sampling interval, the generation condition for the drive pulses P1 is reset upon an arrival of a first sampling timing t1, and a generation condition for drive pulses P2 to be generated during the succeeding second sampling interval S2 is calculated by the control circuit 4. Hereinafter, in a similar manner, the generation condition for the drive pulses P2 is reset at a second sampling timing t2 and a generation condition for drive pulses P3 to be generated during the third sampling interval S3 is calculated. The first and second actuators 3A, 3B are driven by such drive pulses.

(Description of Various Barrel Units)

Various barrel units installable into the electronic camera 1 having the basic construction as described above are described.

<First Barrel Unit>

Figure 6:
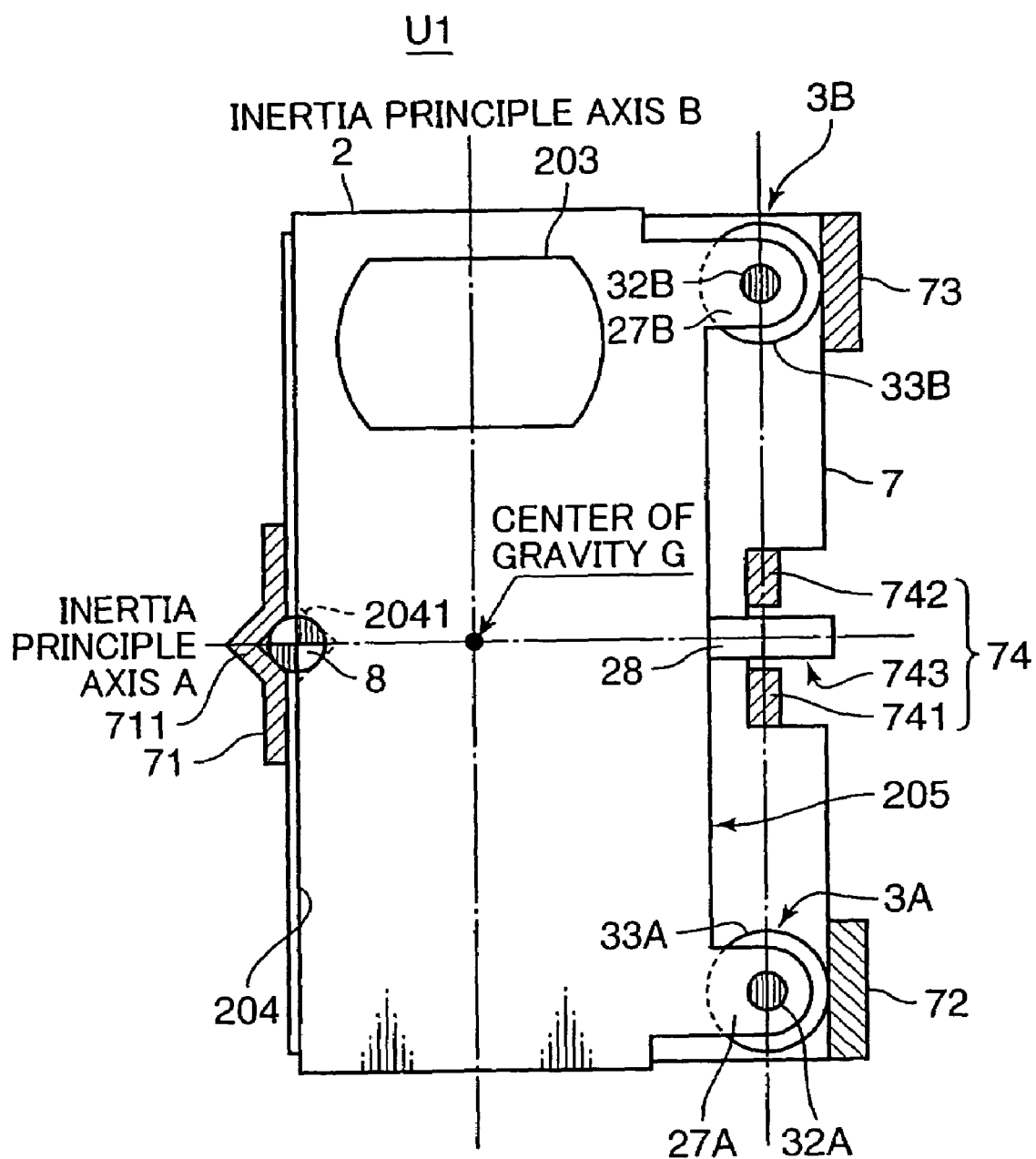
FIG. 6 is a construction diagram schematically showing the construction of a barrel unit according to the embodiment.
Figure 7:
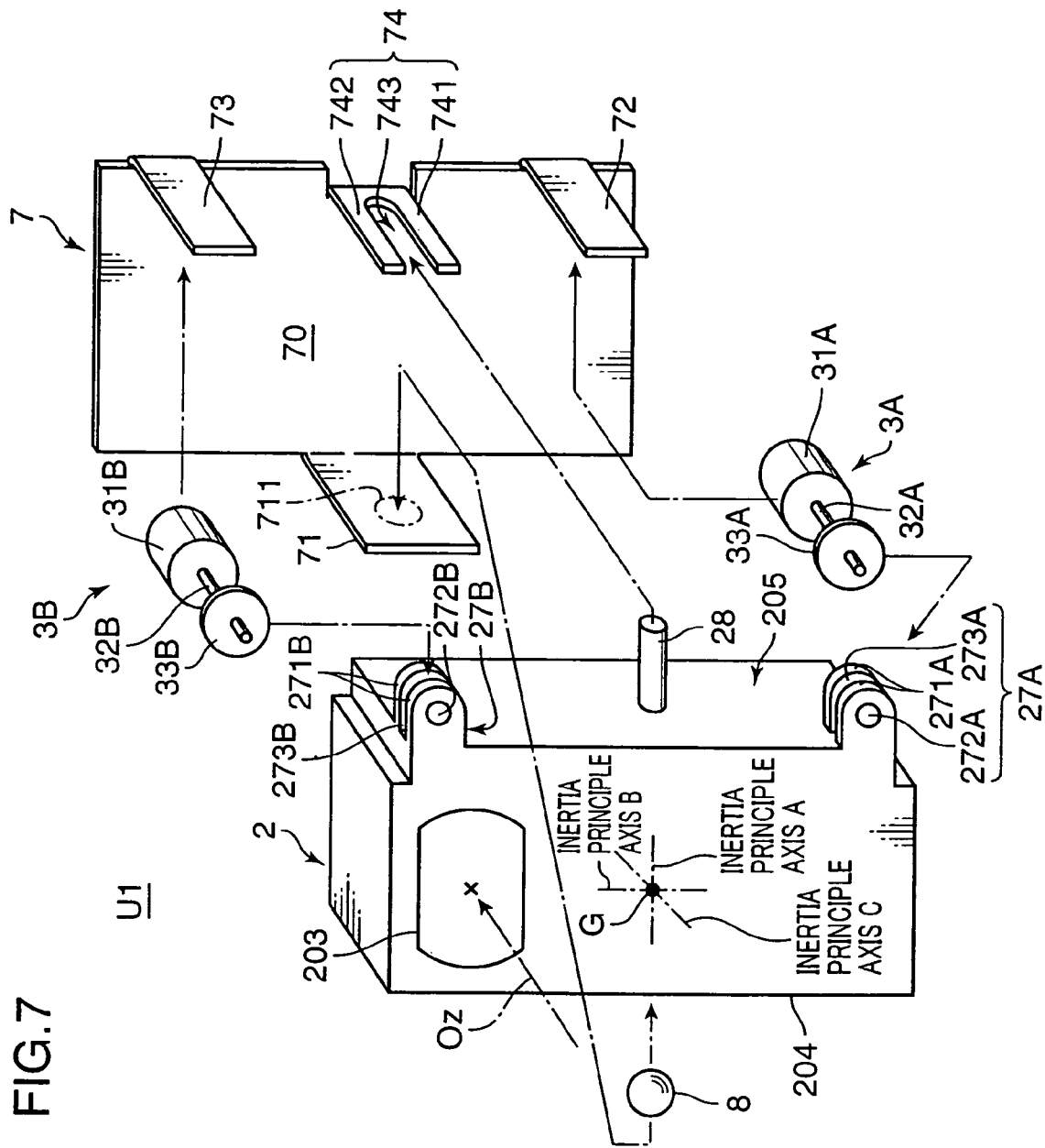
FIG. 7 is an exploded perspective view of the barrel unit.

FIG. 6 is a construction diagram schematically showing the construction of a first barrel unit U1, and FIG. 7 is an exploded perspective view of this barrel unit U1. This barrel unit U1 is comprised of a barrel 2 having an image sensing device and a zooming optical system (photographing optical system) built therein, a supporting member or supporting member 7 for pivotally supporting the barrel 2, a steel ball 8 provided between the barrel 2 and the supporting plate 7 and functioning as a pivot bearing portion, first and second actuators 3A, 3B for giving driving forces to the barrel 2 for shake correction, etc.

The first actuator 3A is constructed by a stepping motor and includes a motor main body 31A having a magnet or the like built therein, an externally threaded rotary shaft 32A and a disk nut 33A. The nut 33A is spirally engaged with the externally threaded rotary shaft 32A and linearly moves along an extending direction of the externally threaded rotary shaft 32A as the externally threaded rotary shaft 32A turns. In other words, the first actuator 3A is a linear actuator capable of giving a linear driving force along forward and backward directions to a drivable member engaged with the nut 33A.

Similarly, the second actuator 3B is a linear actuator including a motor main body 31B having a magnet or the like built therein, an externally threaded rotary shaft 32B and a disk nut 33B and capable of giving a linear driving force along forward and backward directions to a drivable member engaged with the nut 33B.

The barrel 2 includes a container which has a substantially vertically long rectangular shape in front view, having an internal construction as described with reference to FIG. 2, and adapted to bend an optical axis (photographing optical axis Oz) of incident light introduced through an opening 203 substantially at 90 degrees. A recess 2041 for accommodating a part of the steel ball 8 is formed in the middle of one (first side surface 204) of two vertically long side portions of the barrel 2. Further, first and second acting portions 27A, 27B to which the driving forces from the first and second actuators 3A, 3B are given are provided at the opposite upper and bottom ends of the other side portion (second side surface 205).

Here, a gravity point G of the barrel 2 is located at such a position that is a middle point with respect to the height direction (vertical direction of FIG. 6) of the barrel 2, but is slightly displaced toward the first side surface 204 with respect to the widthwise direction (transverse direction of FIG. 6) of the barrel 2. In other words, the first side surface 204 of the barrel 2 is relatively closer to the gravity point G, whereas the second side surface 205 is relatively distant from the gravity point G. Out of three inertia principle axes passing the gravity point G, the one orthogonal to the photographing optical axis Oz of the subject light introduced into the barrel 2 and having a relatively large inertia thereabout is defined to be an inertia principle axis A (first inertia principle axis), the one similarly orthogonal to the photographing optical axis Oz and having an inertia thereabout smaller than the inertia principle axis A is defined to be an inertia principle axis B (second inertia principle axis), and the one parallel with the photographing optical axis Oz is defined to be an inertia principle axis C (third inertia principle axis) (see FIG. 7).

The construction of the barrel 2 based on such a definition is described. The fist and second side surfaces 204, 205 are surfaces parallel with the inertia principle axis B. The recess 2041 for receiving the steel ball 8 as the pivot bearing portion is formed in the first side surface 204 on the inertia principle axis A. The first and second acting portions 27A, 27B, on which the driving forces given from the first and second actuators 3A, 3B act, are arranged at symmetric positions at the upper and bottom ends of the second side surface 205 with respect to the inertia principle axis A. Linear driving forces acting along a direction of the inertia principle axis C are given from the first and second actuators 3A, 3B, which are both linear actuators, to the first and second acting portions 27A, 27B of the barrel 2. As a result, the barrel 2 pivots with the steel ball 8 as a supporting point of rotation as described later.

The first acting portion 27A of the barrel 2 is provided with a pair of nut bearings 271A projecting from the second side surface 205 as shown in FIG. 7. The nut bearings 271A are formed with bearing holes 272A for rotatably supporting the externally threaded rotary shaft 32A of the first actuator 3A. Further, a slit 273A into which the nut 33A is closely fittable is defined between the pair of nut bearings 271A. In other words, the nut 33A is so mounted between the nut bearings 271A as to interfere with each other, and receives forward and backward forces of the nut 33A as the first actuator 3A operates. Similarly, the second acting portion 27B includes a pair of nut bearings 271B, bearing holes 272B and a slit 273B, and receives forward and backward forces of the nut 33B as the first actuator 3B operates.

A guide pin 28 projects from the second side surface 205 of the barrel 2. This guide pin 28 projects along the inertia principle axis A and is engageable with a guide-pin supporting portion 74 of the supporting plate 7 to be described later.

The supporting plate 7 is made of a metal flat plate to be arranged on the rear side (side opposite from the aperture 203) of the barrel 2, and includes four bent portions arranged in such a manner as to embrace the barrel 2. Specifically, as shown in FIG. 7, the supporting plate 7 is comprised of a flat plate main body 70, a steel-ball supporting portion 71, a first-actuator supporting portion 72, a second-actuator supporting portion 73 and the guide-pin supporting portion 74, the supporting portions 71 to 74 being bent substantially at 90 degrees at the lateral edges of the plate main body 70 located at the opposite widthwise ends.

The steel-ball supporting portion 71 is located at a side of the supporting plate 7 corresponding to the first side surface 204 of the barrel 2, and provided with a confining recess 711 for accommodating a part of the steel ball 8. The barrel 2 and the supporting plate 7 are assembled such that the steel ball 8 is held between this confining recess 711 and the recess 2041 formed in the first side surface 204 of the barrel 2.

On the other hand, the first-actuator supporting portion 72 and the second-actuator supporting portion 73 are so located at the upper and bottom ends as to correspond to the positions of the first and second acting portions 27A, 27B of the barrel 2 at a side of the supporting plate 7 corresponding to the second side surface 205 of the barrel 2. Although detailed structures such as screw holes are neither described nor shown, the first and second actuators 3A, 3B are fixedly attached to the first-actuator supporting portion 72 and the second-actuator supporting portion 73 by suitable fixing mechanisms.

The guide-pin supporting portion 74 is located in the middle so as to face the steel-ball supporting portion 71, likewise at the side of the supporting plate 7 corresponding to the second side surface 205 of the barrel 2. The guide-pin supporting portion 74 includes first and second projecting pieces 741, 742 and a slit 743 defined therebetween. The slit 743 is a straight slit extending in the direction of the inertia principle axis C and having substantially the same width as the outer diameter of the guide pin 28 of the barrel 2. In other words, the guide pin 28 is fitted into the slit 743. In the slit 743, the guide pin 28 is slidable along the direction of the inertia principle axis C substantially without any resistance and rotatable about the center axis thereof (also about the inertia principle axis A in this case), whereas the outer diameter of the guide pin 28 and the width of the slit 743 are so selected as to cause no substantial shaking movement of the guide pin 28 along a direction of the inertia principle axis B.

The form of the supporting plate 7 can be arbitrarily set, and the steel-ball supporting portion 71, the first-actuator supporting portion 72, the second-actuator supporting portion 73 and the guide-pin supporting portion 74 may be suitably arranged in conformity with the internal construction of the electronic camera 1 into which the barrel unit U1 is incorporated. Further, the first and second actuators 3A, 3B may be installed in the barrel 2.

Figure 8A:
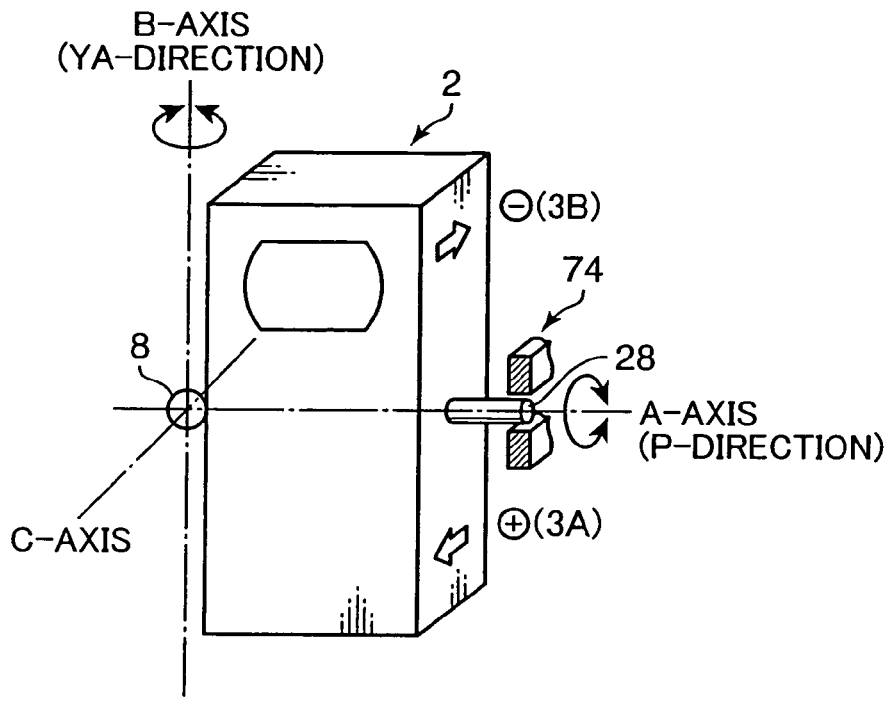
Figure 8B:
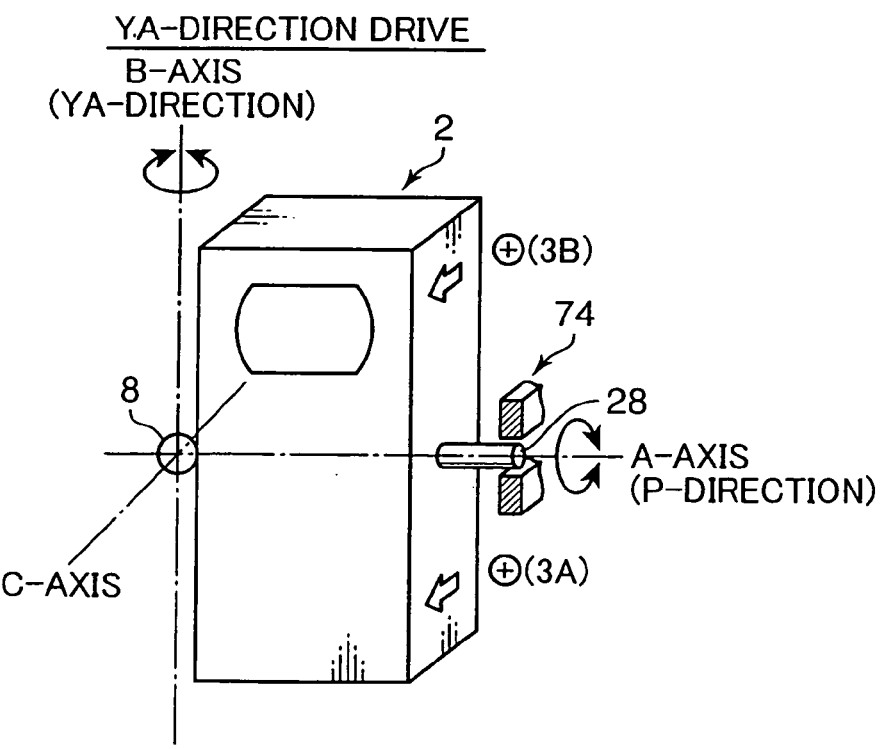

The operation of the barrel unit U1 constructed as above is described. FIGS. 8A and 8B are diagrammatic perspective views showing driven states of the barrel 2 for shake correction. Since the barrel unit U1 is pivotally supported on the steel ball 8, the supporting point by the steel ball 8 serves as a center of rotation of the barrel 2 and the barrel unit U1 is rotatable along three directions about A-, B-, C-axes, which are three axes passing the supporting point. Here, if the directions defined in FIG. 1 are applied, the A-axis corresponds to an axis of rotation in pitch directions; the B-axis an axis of rotation in yaw directions; and the C-axis an axis of rotation along the direction of the optical axis. Rotation about the C-axis is restricted by a motion confining mechanism comprised of the guide pin 28 and the guide-pin supporting portion 74. Here, the A-axis substantially coincides with the inertia principle axis A passing the gravity point G shown in FIG. 7. On the other hand, the B- and C-axes do not coincide with the inertia principle axes B, C since the center of rotation is set outside the barrel 2.

First, a case where the barrel 2 is driven in pitch direction for shake correction is described with respect to FIG. 8A. In the case of driving in pitch direction, the driving directions of the first and second actuators 3A, 3B are opposite from each other as shown in arrows in FIG. 8A in order to pivot the barrel 2 about the A-axis. In other words, the nut 33A of the first actuator 3A is driven forward (+ driving), whereas the nut 33B of the second actuator 3B is driven backward (− driving). Alternatively, the nut 33A is driven backward (− driving), whereas the nut 33B is driven forward (+ driving). Such driving forces are given to the first and second acting portions 27A, 27B, whereby the barrel 2 is rotated about the A-axis with the supporting point by the steel ball 8 as the center of rotation.

Figure 9:
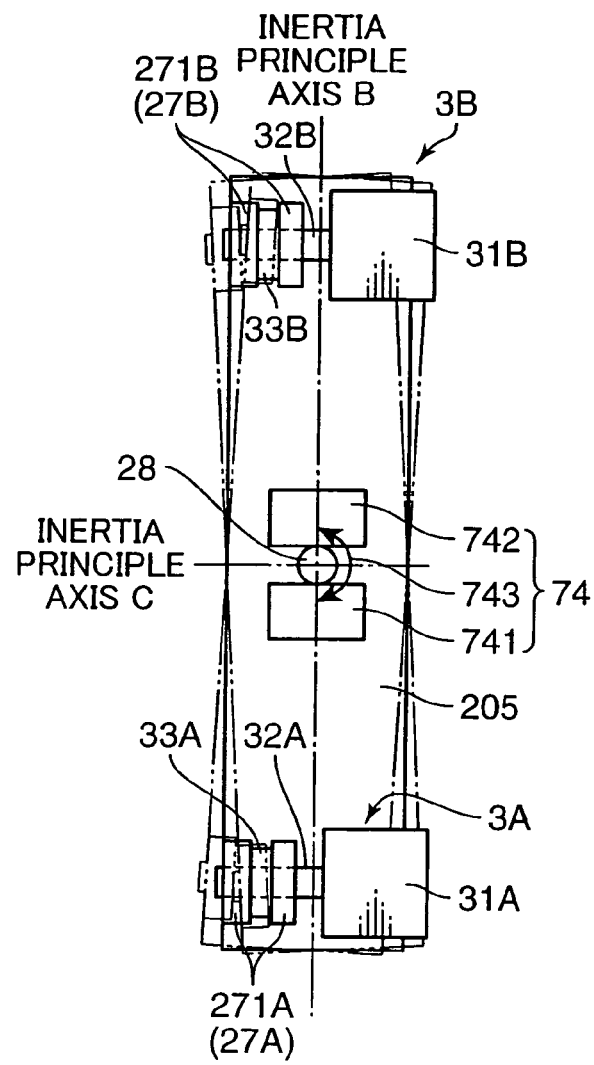
FIG. 9 is a side view showing in phantom a state where the barrel shown in FIGS. 6 and 7 is driven in pitch direction.

FIG. 9 is a side view showing in phantom a driven state of the barrel 2 shown in FIGS. 6 and 7 in pitch directions. It should be noted that the supporting plate 7 is partly shown, i.e., only a part of the guide-pin supporting portion 74 is shown in FIG. 9. At the time of this driving in pitch directions, the guide pin 28 revolves in the slit 743 of the guide-pin supporting portion 74 as shown by arrows in FIG. 9.

Next, in the case of driving in yaw direction, the driving directions of the first actuator 3A and the second actuator 3B are the same as shown in FIG. 8B. In other words, the nut 33A of the first actuator 3A is driven forward (+ driving) and the nut 33B of the second actuator 3B is also driven forward (+ driving). Alternatively, the nuts 33A, 33B are both driven backward (− driving). Such driving forces are given to the first and second acting portions 27A, 27B, whereby the barrel 2 is rotated about the B-axis with the supporting point by the steel ball 8 as the center of rotation.

Figure 10:
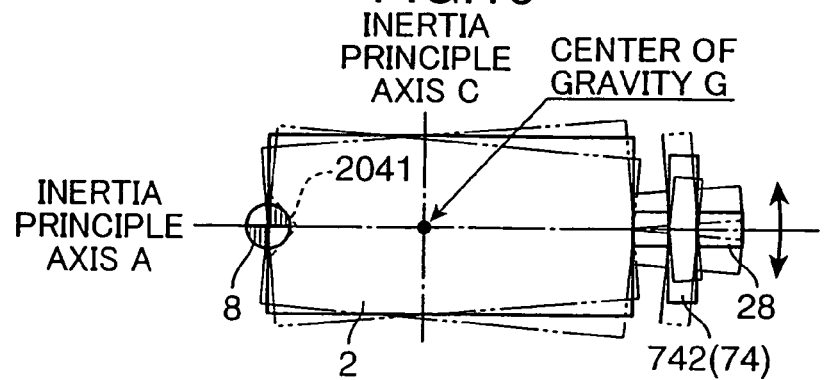
FIG. 10 is a side view showing in phantom a state where the barrel shown in FIGS. 6 and 7 is driven in yaw direction.

FIG. 10 is a plan view showing in phantom a driven state of the barrel 2 shown in FIGS. 6 and 7 in yaw directions. It should be noted that, in FIG. 10, the supporting plate 7 is partly shown, i.e., only a part of the guide-pin supporting portion 74 is shown, and the first actuator 3A is not shown. At the time of this driving in yaw directions, the guide pin 28 slides in the slit 743 of the guide-pin supporting portion 74 as shown by arrows in FIG. 10. Strictly speaking, the guide pin 28 moves along an arcuate path centered on the supporting point by the steel ball 8.

Such a barrel unit U1 can have an optimal construction having small inertial loads of the first and second actuators 3A, 3B and enabling the barrel 2 to be stably driven for shake correction in the case that the barrel 2 is supported by two actuators and one pivot bearing portion. Specifically, the gravity point G of the barrel 2 is located within an area enclosed by the first acting portion 27A by the first actuator 3A, the second acting portion 27B by the second actuator 3B and the steel ball 8, and the arrangement of the first and second actuators 3A, 3B are optimized. Thus, the loads of the respective actuators are distributed, and the barrel 2 can be precisely driven for shake correction by using two actuators having a relatively small driving performance.

Specifically, since the first and second acting portions 27A, 27B, which receive the driving forces from the first and second actuators 3A, 3B, are located at the second side surface 205 relatively distant from the gravity point G of the barrel 2, substantially most distant from the A-axis and also distant from the B-axis, the inertial loads are substantially minimized and the barrel 2 can be driven for shake correction using small-size actuators having a low torque (low power consumption). Further, since the first and second actuators 3A, 3B are arranged at symmetric positions with respect to the A-axis, the barrel 2 can be driven for shake correction by causing the first and second actuators 3A, 3B to generate equal driving forces (using the same actuators). Accordingly, the driving forces generated by the respective actuators can be substantially minimized, and a driving system having a high dynamic symmetry can be built while arranging the pivot bearing portion at the outer side of the barrel. Therefore, there is an advantage of enabling the barrel 2 to be stably driven for shake correction by eliminating dynamically unstable elements.

Further, since the first and second acting portions 27A, 27B of the first and second actuators 3A, 3B are arranged at positions substantially most distant from the supporting point by the steel ball 8 as the center of rotation, a resolution to move the barrel 2 becomes higher and, as a result, the barrel 2 can be highly precisely driven for shake correction.

Figure 11:
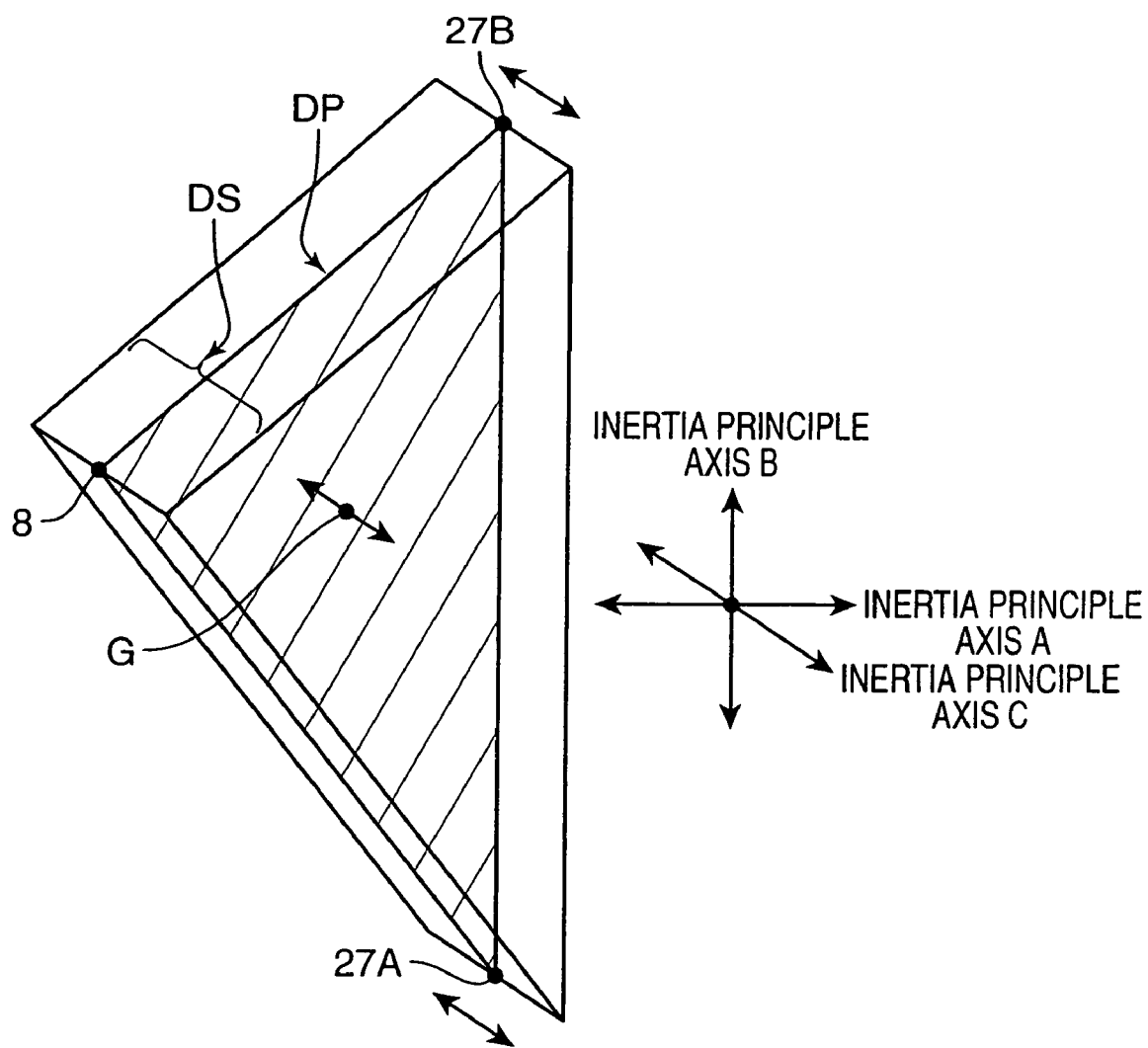
FIG. 11 is a diagram showing an area surrounding the gravity point of the barrel.

Although the arrangement of the gravity point G of the barrel 2 within the area enclosed by the first acting portion 27A, the second acting portion 27B and the supporting point by steel ball 8 is important, this "enclosed area" is not limited to a two-dimensional area defined by connecting the above three points, and may be a three-dimensional space including the driving directions (direction of the inertia principle axis C shown in FIG. 7 in this case) of the barrel 2 by the first and second actuators 3A, 3B. FIG. 11 is a diagram showing this point.

As shown in FIG. 11, in the case of setting the area enclosing the gravity point G of the barrel 2, it is, in fact, difficult in some cases due to a design limitation or other factors to arrange the gravity point G of the barrel 2 in a two-dimensional area DP enclosed by the first acting portion 27A, the second acting portion 27B and the supporting point by the steel ball 8. On the other hand, a slight deviation of the gravity point G of the barrel 2 from the two-dimensional area DP has a little influence. Accordingly, a three-dimensional space area DS extending from the two-dimensional area DP as a basis in forward and backward directions (direction of the optical axis) along the inertia principle axis C in which the barrel 2 is driven by the actuators may be set as the "enclosed area" within which the gravity point G of the barrel 2 is located, and the positions of the first acting portion 27A, the second acting portion 27B and the steel ball 8 may be so determined as to locate the gravity point G within such a three-dimensional area DS.

Figure 12:
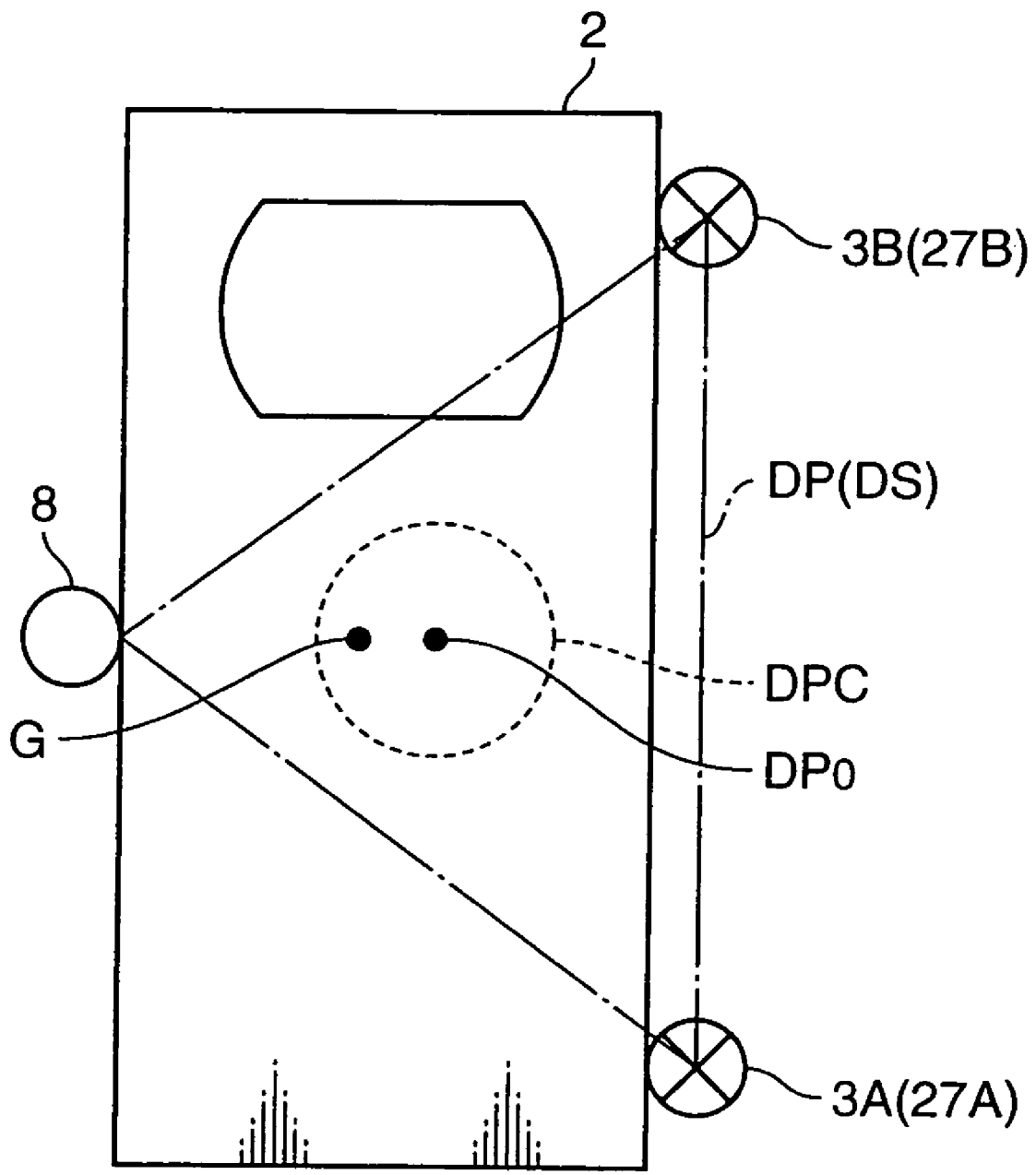
FIG. 12 is a diagram showing a preferable gravity point position of the barrel.

It is desirable to determine the positions of the first acting portion 27A, the second acting portion 27B and the steel ball 8 such that the gravity point G of the barrel 2 coincides with or is proximate to the gravity point of the two-dimensional area DP (or the three-dimensional space area DS) enclosed by three supporting points, i.e., the first acting portion 27A, the second acting portion 27B and the supporting point by the steel ball 8. Specifically, if $DP_0$, DPC denote the gravity point of the two-dimensional area DP (or three-dimensional space area DS) and a proximate area to the gravity point $DP_0$ as shown in FIG. 12, it is desirable to set the positions of the three supporting points such that the gravity point G of the barrel 2 coincides with the gravity point $DP_0$ or is located within the proximate area DPC. With such a construction, the loads of the actuators can be more distributed (equalized) since the gravity point G of the barrel 2 is arranged to coincide with or to be proximate to the gravity point of the area enclosed by the three supporting points enclosing the gravity point G. Such an idea of arrangement is also adopted for the barrel unit U1 of this embodiment.

<Second Barrel Unit>

Figure 13:
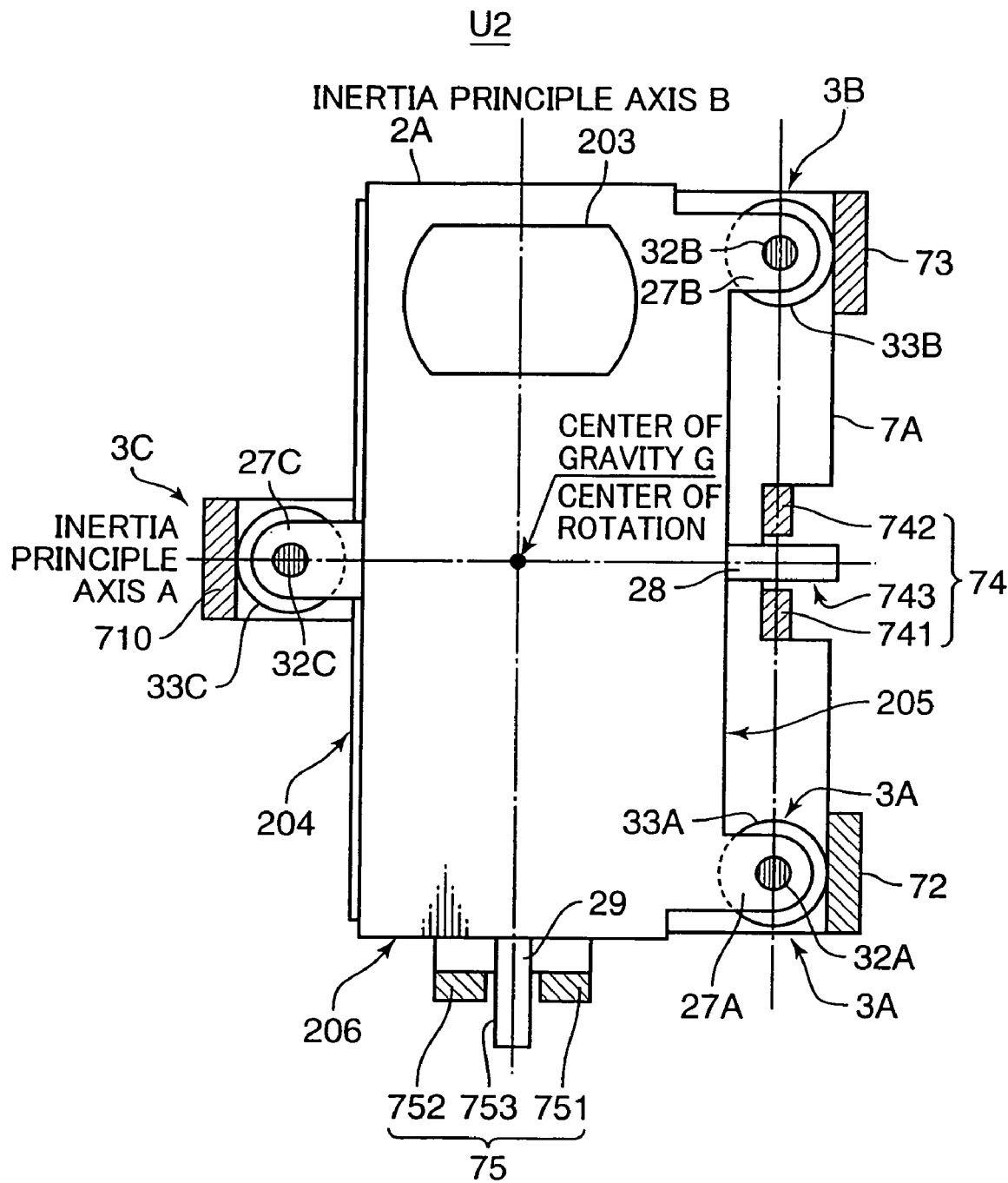
FIG. 13 is a construction diagram schematically showing the construction of another barrel unit according to the embodiment of the invention.
Figure 14:
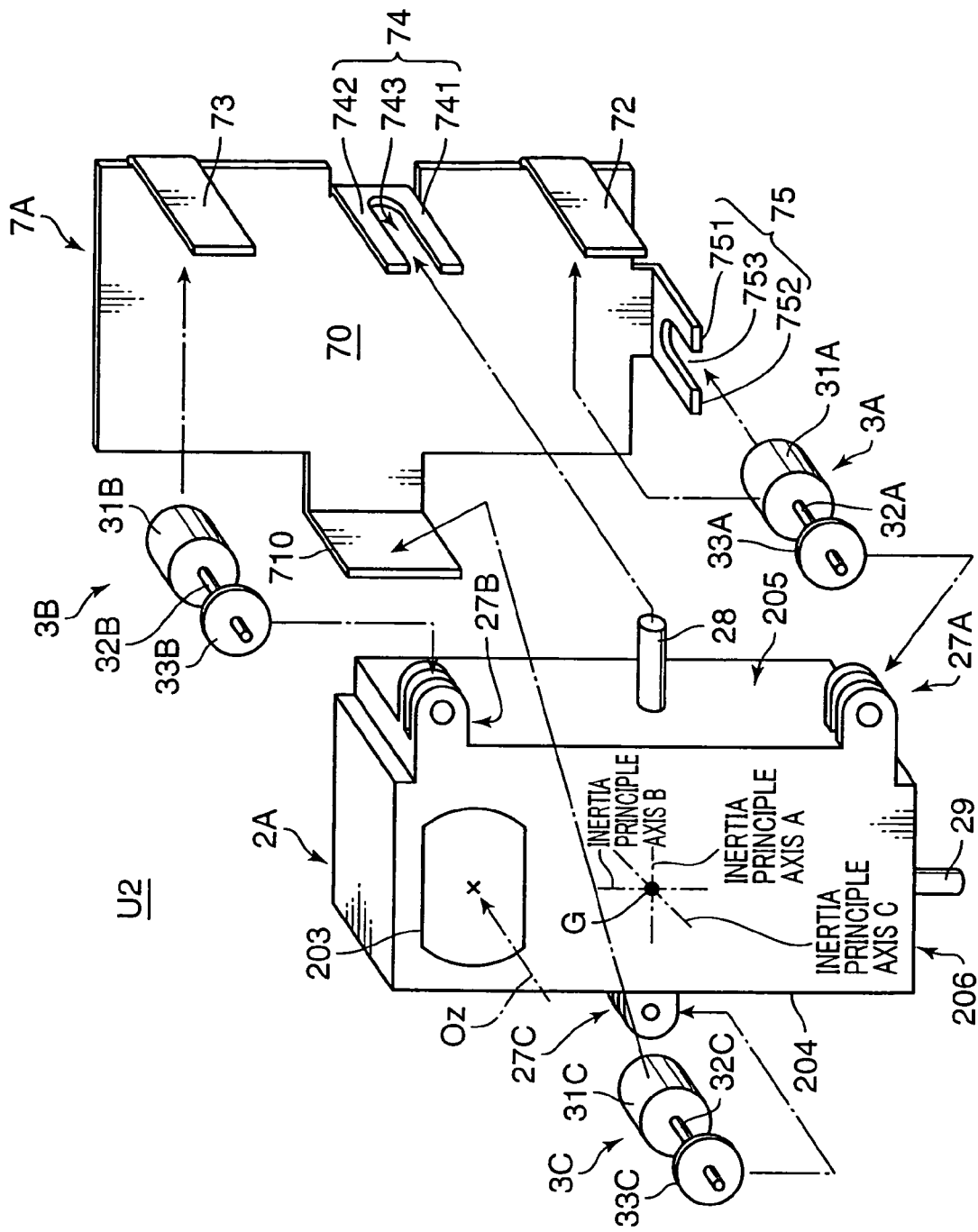
FIG. 14 is an exploded perspective view of the barrel unit of FIG. 13.

FIG. 13 is a schematic construction diagram showing the construction of a second barrel unit U2, and FIG. 14 is an exploded perspective view of this barrel unit U2. Similar to the first barrel unit U1, the second barrel unit U2 is provided with a barrel 2A having an image sensing device and a zooming optical system (photographing optical system) built therein, and a supporting plate 7 for pivotally supporting the barrel 2A. However, the barrel unit U2 differs from the barrel unit U1 in that the steel ball 8 is not used, and the barrel 2A is supported at three points by three actuators: a first actuator 3A, a second actuator 3B and a third actuator 3C for giving driving forces in different directions to the barrel 2A for shake correction. The description of the second barrel unit U2 below is centered on points of difference from the first barrel unit U1.

The first to third actuators 3A to 3C are linear actuators each including a stepping motor similar to the first barrel unit U1. The third actuator 3C added in this embodiment also includes a motor main body 31C, an externally threaded rotary shaft 32C and a disk nut 33C as described above.

The barrel 2A includes a container which has a substantially vertically long rectangular shape in front view, and adapted to bend an optical axis of an incident light introduced through an opening 203 substantially at 90 degrees similar to the barrel 2 of the first barrel unit U1. First and second acting portions 27A, 27B to which driving forces from the first and second actuators 3A, 3B are given are provided on a second side surface 205 of the barrel 2A similar to the first barrel unit U1. In addition, a third acting portion 27C to which a driving force from the third actuator 3C is given is provided in the center of a first side surface 204. The first to third actuators 3A to 3C are arranged such that a gravity point G of the barrel 2A is located within an area enclosed by these three acting portions (first to third acting portions 27A to 27C).

Here, it is assumed that the gravity point G of the barrel 2A is, as shown in FIG. 13, located at a middle point with respect to the height direction of the barrel 2A (vertical direction of FIG. 13) although being slightly displaced toward the first side surface 204 with respect to the width direction thereof (transverse direction of FIG. 13). Specifically, the first side surface 204 of the barrel 2A is a side surface relatively close to the gravity point G, whereas the second side surface is the one relatively distant from the gravity point G (the same as in FIG. 6). In similar to FIG. 6, out of three inertia principle axes passing the gravity point G, the one orthogonal to a photographing optical axis Oz of a subject light and having a relatively large inertia thereabout is defined to be an inertia principle axis A (first inertia principle axis), the one similarly orthogonal to the photographing optical axis Oz and having an inertia thereabout smaller than the inertia principle axis A is defined to be an inertia principle axis B (second inertia principle axis), and the one parallel with the photographing optical axis Oz is defined to be an inertia principle axis C (third inertia principle axis) (see FIG. 14).

The construction of the barrel 2A based on such a definition is described. The fist and second side surfaces 204, 205 are surfaces parallel with the inertia principle axis B. The third acting portion 27C on which a driving force given from the third actuator 3C acts is provided on the first side surface 204 on the inertia principle axis A. Further, the first and second acting portions 27A, 27B, on which driving forces given from the first and second actuators 3A, 3B, are arranged at symmetric positions at the upper and bottom ends of the second side surface 205 with respect to the inertia principle axis A. Linear driving forces acting along a direction of the inertia principle axis C are given from the first to third actuators 3A to 3C, which are linear actuators, to the first to third acting portions 27A to 27C of the barrel 2A. It should be noted that no description is given on the constructions of the first to third acting portions 27A to 27C because they are the same as in the first barrel unit U1.

This barrel 2A is provided with two guide pins (first guide pin 28 and second guide pin 29). The first guide pin 28 projects from the second side surface 205 of the barrel 2A along the inertia principle axis A. On the other hand, the second guide pin 29 projects from a bottom surface 206 of the barrel 2A along the inertia principle axis B. These first and second guide pins 28, 29 are respectively engageable with first and second guide-pin supporting portions 74, 75 to be described later.

A supporting plate 7A is made of a metal flat plate to be arranged on the rear side (side opposite from the aperture 203) of the barrel 2A, and includes five bent portions arranged in such a manner as to embrace the barrel 2A. Specifically, as shown in FIG. 14, the supporting plate 7A is comprised of a flat plate main body 70, a third-actuator supporting portion 710, a first-actuator supporting portion 72, a second-actuator supporting portion 73, the guide-pin supporting portion 74, and the second guide-pin supporting portion 75, the supporting portions 72, 73, 74 and 710 being bent substantially at 90 degrees at the lateral edges of the plate main body 70 located at the opposite widthwise ends, and the supporting portion 75 being bent at the bottom end of the main portion 70.

The first-actuator supporting portion 72 and the second-actuator supporting portion 73 are so located at the upper and bottom ends as to correspond to the positions of the first and second acting portions 27A, 27B of the barrel 2A at a side of the supporting plate 7A corresponding to the second side surface 205 of the barrel 2A. On the other hand, the third-actuator supporting portion 710 is located in the middle so as to correspond to the position of the third acting portion 27C at a side of the supporting plate 7A corresponding to the first side surface 204 of the barrel 2A. The first to third actuators 3A to 3C are fixedly attached to these three actuator supporting portions by suitable fixing mechanisms.

The guide-pin supporting portion 74 is located in the middle so as to face the third actuator supporting portion 710 at the side of the supporting plate 7 corresponding to the second side surface 205 of the barrel 2A. As described in the first barrel unit U1, the guide-pin supporting portion 74 includes first and second projecting pieces 741, 742 and a slit 743 (straight slit extending in the direction of the inertia principle axis C) defined therebetween. The guide pin 28 is fitted into this slit 743. The second guide-pin supporting portion 75 is located at a side of the supporting plate 7A corresponding to the bottom surface 206 of the barrel 2A, and the structure thereof is similar to that of the first guide-pin supporting portion 74. In other words, the second guide-pin supporting portion 75 includes first and second projecting pieces 751, 752 and a slit 753 (straight slit extending in the direction of the inertia principle axis C) defined therebetween. The guide pin 29 is fitted into this slit 753.

Figure 15A:
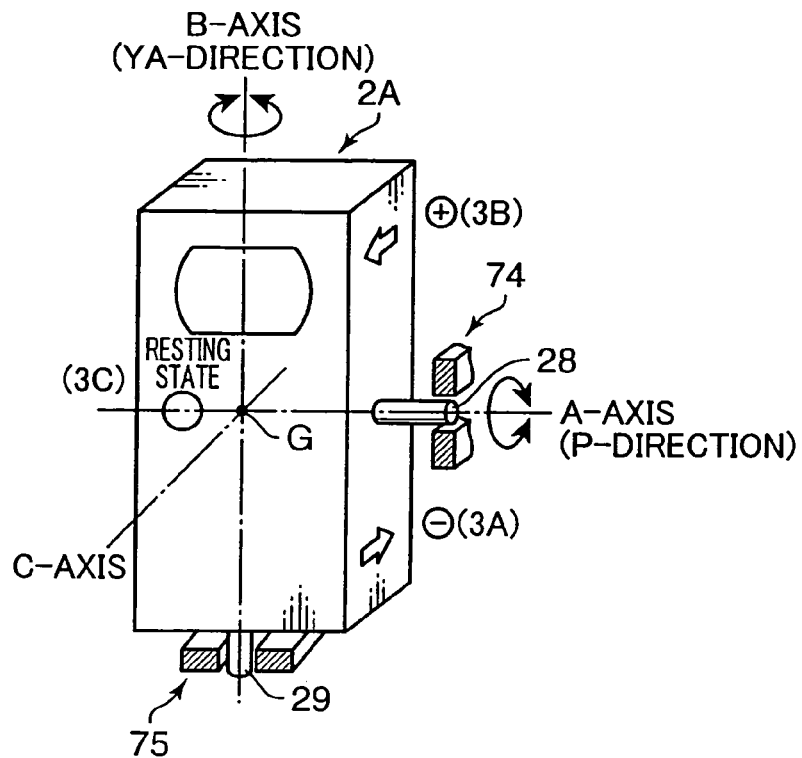
Figure 15B:
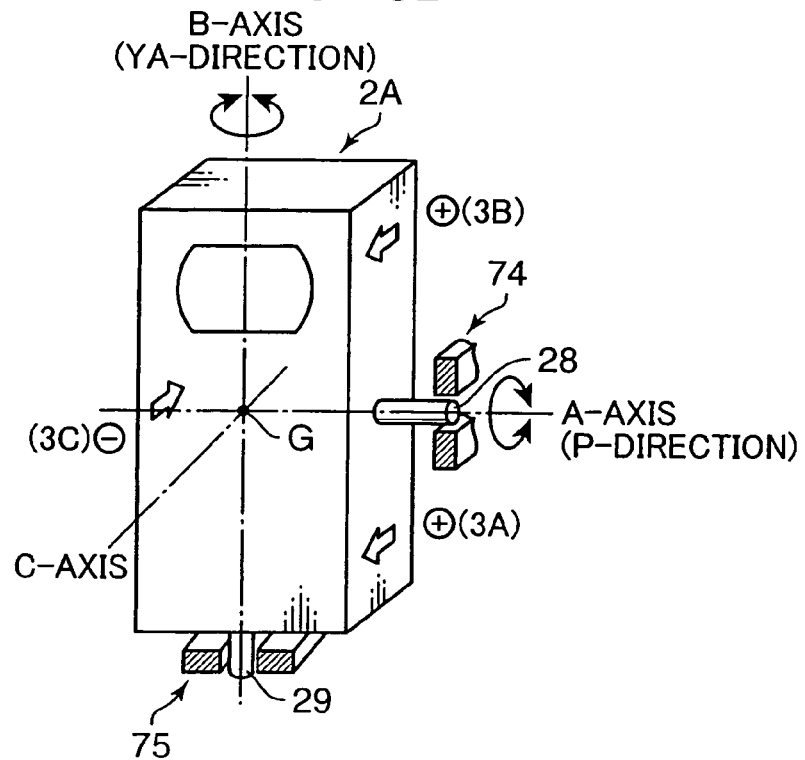

The operation of the barrel unit U2 constructed as above is described. FIGS. 15A and 15B are diagrammatic perspective views showing driven states of the barrel 2A for shake correction. Since the barrel unit U2 is supported at three points by the three actuators (first to third acting portions 27A to 27C of the first to third actuators 3A to 3C), a center of rotation is located inside the barrel 2A. Here, the arrangement of the first to third acting portions 27A to 27C is determined such that this center of rotation substantially coincides with the gravity point G of the barrel 2A. With such an arrangement, the shake of the barrel 2A can be fairly precisely corrected by smallest driving forces. However, the gravity point G and the center of rotation may be slightly deviated from each other.

The barrel unit U2 is rotatable along three directions about A-, B-, C-axes, which are three axes passing the center of rotation (gravity point G). Here, if the directions defined in FIG. 1 are applied, the A-axis corresponds to an axis of rotation in pitch directions; the B-axis an axis of rotation in yaw directions; and the C-axis an axis of rotation in the directions of the optical axis. Rotation about the C-axis is restricted by a motion confining mechanism comprised of the first guide pin 28 and the first guide-pin supporting portion 74, and the second guide pin 29 and the second guide-pin supporting portion 75. The second guide pin 29 and the second guide-pin supporting portion 75 exclusively restrict shaking movements along the A-axis with the first guide pin 28 as a supporting point resulting from the arrangement of the third actuator 3C in place of the steel ball 8 of the first barrel unit U1. In this embodiment, since the center of rotation and the gravity point G coincide, the A-, B- and C-axes coincide with the inertia principle axes A, B, C passing the gravity point G shown in FIG. 14.

First, a case where the barrel 2A is driven in pitch direction for shake correction is described with respect to FIG. 15A. In the case of driving in pitch direction, the driving directions of the first and second actuators 3A, 3B are opposite from each other as shown in arrows in FIG. 15A in order to pivot the barrel 2A about the A-axis. In other words, the nut 33A of the first actuator 3A is driven forward (+ driving), whereas the nut 33B of the second actuator 3B is driven backward (− driving). Alternatively, the nut 33A is driven backward (− driving), whereas the nut 33B is driven forward (+ driving). On the other hand, the third actuator 3C is kept in a resting state so as to give no driving force to the barrel 2A. Such driving forces are given to the first and second acting portions 27A, 27B, whereby the barrel 2A is rotated about the A-axis with the above center of rotation (gravity point G) as a center.

At the time of driving in pitch direction, the first guide pin 28 revolves in the slit 743 of the first guide-pin supporting portion 74. Further, the second guide pin 29 slides in the slit 753 of the second guide-pin supporting portion 75 (strictly speaking, moves along an arcuate path centered on the center of rotation).

Next, in the case of driving in yaw direction, the driving direction of the first actuator 3A and that of the second actuator 3B are the same as shown in FIG. 15. In other words, the nut 33A of the first actuator 3A is driven forward (+ driving), and the nut 33B of the second actuator 3B is also driven forward (+ driving). On the other hand, the nut 33C of the third actuator 3C is driven backward (− driving). Alternatively, both nuts 33A and 33B are driven backward (− driving), whereas the nut 33C is driven forward (+ driving). Such driving forces are given to the first, second and third acting portions 27A, 27B, 27C, whereby the barrel 2A is rotated about the B-axis with the above center of rotation (gravity point G) as a center.

At the time of driving in yaw direction, the first guide pin 28 slides in the slit 743 of the first guide-pin supporting portion 74. Further, the second guide pin 29 revolves in the slit 753 of the second guide-pin supporting portion 75.

According to such a barrel unit U2, the inertial loads of the first to third actuators 3A to 3C can be reduced and an optimal construction capable of performing a stable shake correction can be provided in the case of supporting the barrel by three actuators. Specifically, the gravity point G of the barrel 2A is located within the area enclosed by the first to third acting portions 27A to 27C by the first to third actuators 3A to 3C, and the arrangement of the first to third actuators 3A to 3C are optimized. Thus, the loads of the respective actuators are distributed, therefore the barrel can be precisely driven for shake correction by adopting three actuators having a relatively smaller driving performance. Further, the barrel 2A can be stably driven for shake correction by eliminating dynamically unstable elements. Furthermore, since the barrel 2A is driven for shake correction using three actuators, which are more than those used in the first barrel unit U1, the load of each actuator is further reduced and, therefore, there is an advantage that the actuators can be miniaturized or can be driven at higher speeds.

<Third Barrel Unit>

Figure 16:
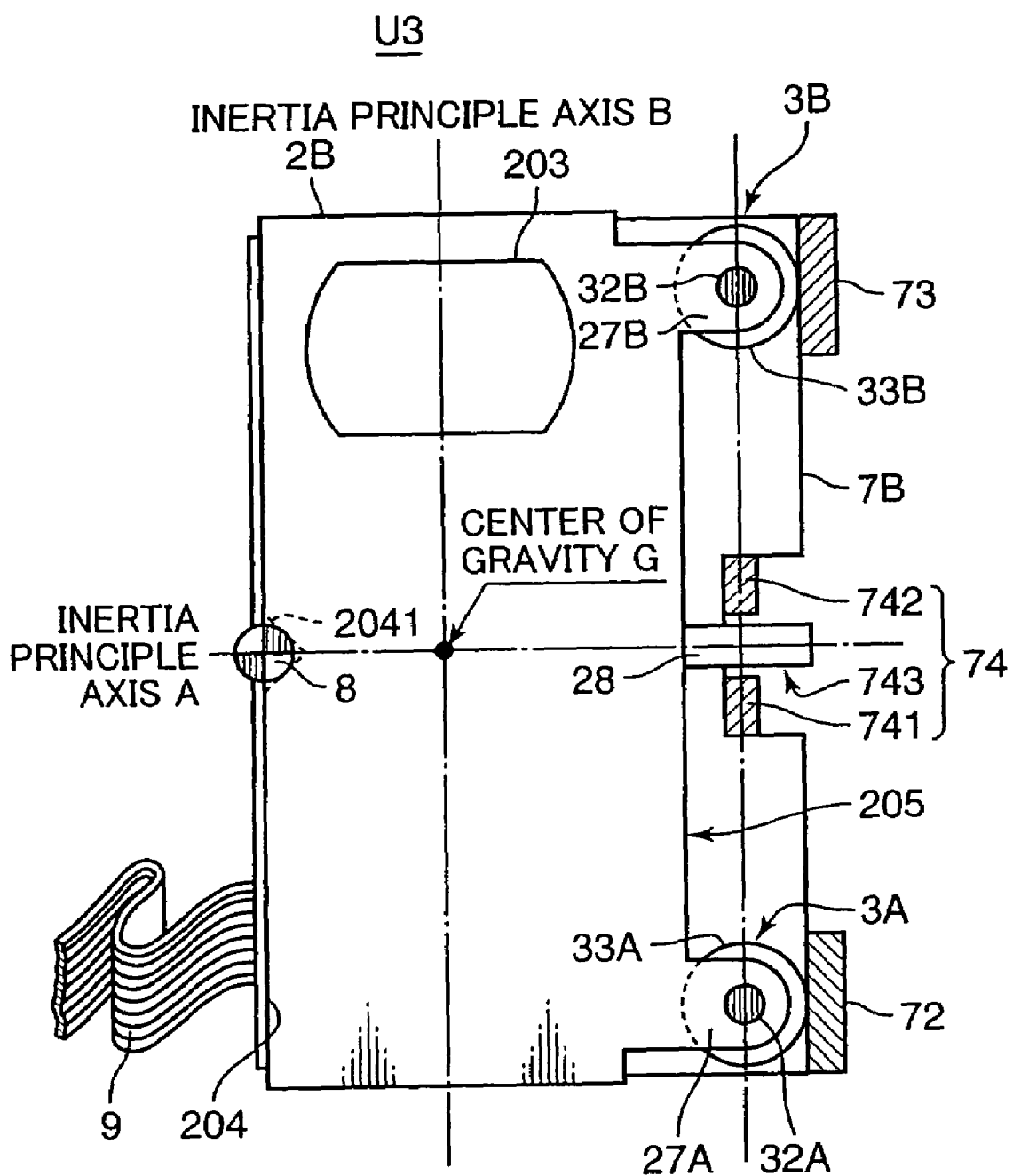
FIG. 16 is a construction diagram schematically showing the construction of still another barrel unit according to the embodiment of the invention.

FIG. 16 is a schematic construction diagram showing the construction of a third barrel unit U3. The third barrel unit U3 is similar to the first barrel unit U1 in being provided with a barrel 2B, a supporting plate 7B for pivotally supporting the barrel 2B, a steel ball 8 as a pivot bearing portion provided between the barrel 2B and the supporting plate 7B, and first and second actuators 3A, 3B for giving driving forces to the barrel 2B for shake correction, but differs therefrom in that a flexible cable 9 (attachment which moves according to a pivotal movement of the barrel 2B) for electrically connecting an image sensing device 26 (see FIG. 2) built in the barrel 2B and a control circuit board (main body of an image pickup apparatus) provided in the main body 10 is connected with the barrel 2B.

In some cases, various attachments are connected with the barrel 2B. For example, in the case that the image sensing device is built in the barrel 2B, the flexible cable 9 for electrically connecting the image sensing device 26 and the control circuit board is attached to the barrel 2B. In this embodiment, such a flexible cable 9 is connected with a first side surface 204 of the barrel 2B.

As shown in FIG. 16, the flexible cable 9 is connected with the barrel 2B while being so bent as to permit a pivotal movement of the barrel 2B. By adopting such a connecting mode, a biasing force is given to the barrel 2B in pushing or pulling direction. Upon the action of such a biasing force on the barrel 2B, the gravity point G of the barrel 2B does not simply act as a gravity point in terms of weight.

In view of this, the first actuator 3A, the second actuator 3B and the steel ball 8 are so positioned as to enclose the gravity point considering the influence of the biasing force of the flexible cable 9 in the barrel unit U3 of this embodiment. With this construction, in view of an actual situation where an attachment such as the flexible cable 9 is connected with the barrel 2B, the shake correction can be performed in consideration of the substantial gravity point at the time of an actual pivotal movement. Thus, the barrel 2B can be more precisely driven for shake correction.

<Fourth Barrel Unit>

Figure 17:
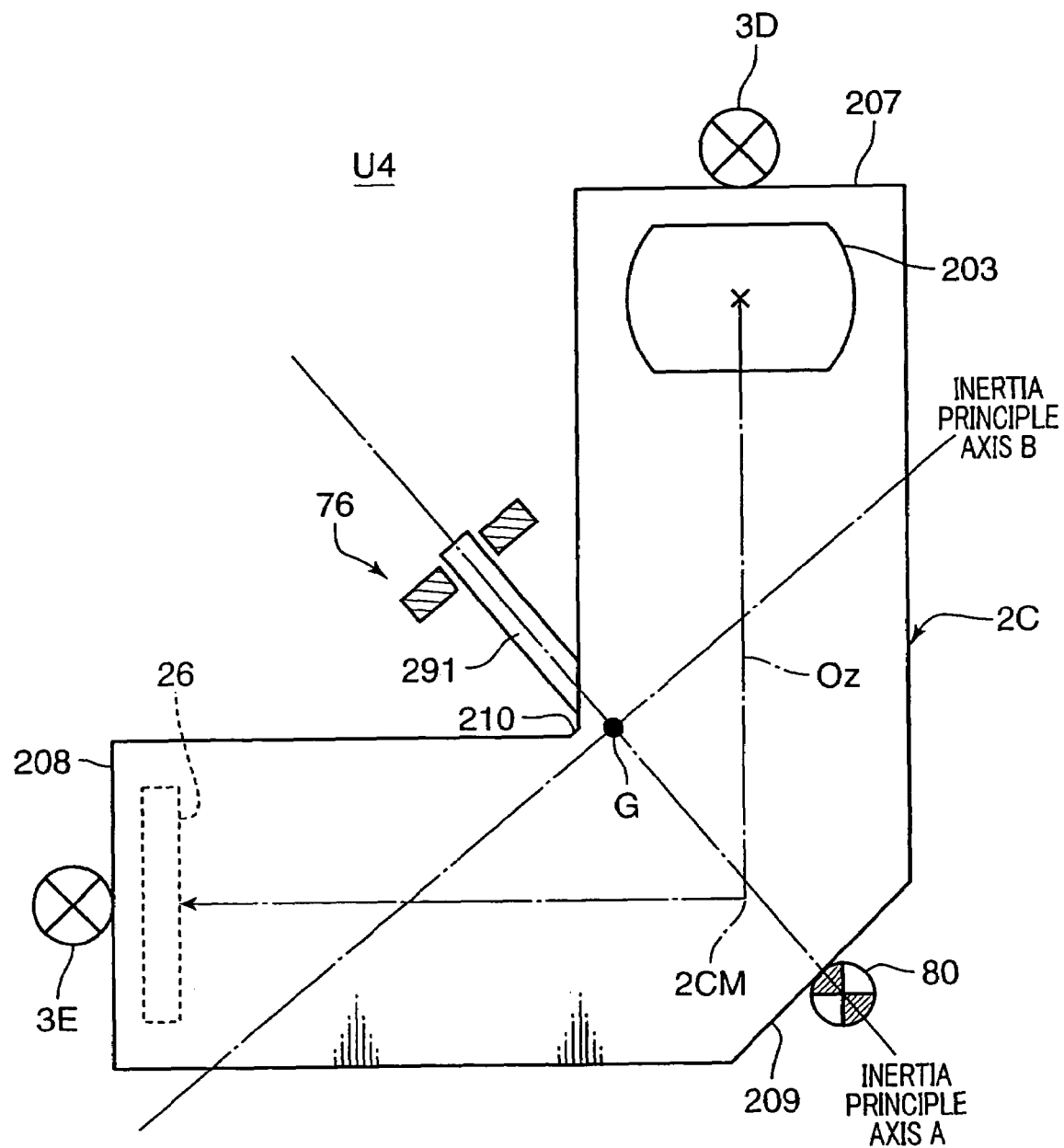
FIG. 17 is a construction diagram schematically showing the construction of further another barrel unit according to the embodiment of the invention.

FIG. 17 is a diagram schematically showing the construction of a fourth barrel unit U4. Unlike the barrels in which the optical axis (photographing optical axis Oz) of the incident light is bent substantially at 90 degrees once as shown in the first to third barrel units, a double-barrel 2C in which a photographing optical axis Oz of an incident light introduced through an aperture 203 is bent substantially at 90 degrees to propagate different directions twice near the aperture 203 and near an intermediate portion is driven for shake correction in the fourth barrel unit U4.

The double-barrel 2C has a tubular body L-shaped in front view and having an intermediate bent portion 2CM, wherein the aperture 203 is arranged at one end 207 thereof and an image sensing device 26 is arranged at an other end 208 thereof. Two prisms for bending the photographing optical axis Oz substantially at 90 degrees twice, a lens block constructing a photographing optical system and the like are arranged inside the barrel 2C. It should be noted that the prisms are arranged behind the opening 203 and near the intermediate bent portion 2CM of the barrel 2C.

Here, if it is assumed that the gravity point G of the barrel 2C constructed as above is located near an inner side 210 of the intermediate bent portion 2CM, acting portions of first and second actuators 3D and 3E and a steel ball 80 are so arranged as to enclose this gravity point G. Specifically, the first actuator 3D is arranged at the one end 207 of the barrel 2C, the second actuator 3E is arranged at the other end 208, and the steel ball 80 is arranged at an outer side 209 of the intermediate bent portion 2CM, wherein the gravity point G of the barrel 2C is located with an area enclosed by theses three supporting points.

If it is assumed that, out of three inertia principle axes passing the gravity point G, a first inertia principle axis (inertia principle axis A) orthogonal to the optical axis is an axis orthogonal to a line connecting the acting portions of the first and second actuators 3D and 3E, and a second inertia principle axis (inertia principle axis B) is an axis orthogonal to the inertia principle axis A, the steel ball 80 is located on the inertia principle axis A. Further, the first and second actuators 3D, 3E are respectively so arranged at the one end 207 and at the other end 208 as described above as to be most distant from the inertia principle axis A. It should be noted that the acting portion of a third actuator may be arranged at the outer side 209 in place of the steel ball 80.

A guide pin 291 projects on the inertia principle axis A at the inner side 210 of the intermediate bent portion 2CM of the barrel 2C. This guide pin 291 is fitted into a guide-pin supporting portion 76 similar to the one described in the foregoing embodiments, whereby the rotation of the barrel 2C about a third inertia principle axis parallel with the optical axis is restricted.

In the barrel unit U4 thus constructed, the barrel 2C is driven for shake correction with a supporting point by the steel ball 80 as a center of rotation by driving forces given from the first and second actuators 3D, 3E. In other words, the barrel 2C is driven for shake correction about the inertia principle axis A by driving the first and second actuators 3D, 3E in opposite directions. Alternatively, the barrel 2C is driven for shake correction about an axis parallel with the inertia principle axis B and passing the supporting point by the steel ball 80 by driving the first and second actuators 3D, 3E in the same direction.

(Description of Other Modifications)

The present invention may also be embodied as follows.

(1) Although the barrel is supported at three supporting points, i.e., supported by the acting portions of the two actuators and one steel ball or supported by three actuators in the foregoing embodiments, it may be supported at four or more supporting points, and the gravity point thereof may be located within an area enclosed by these supporting points. For example, two small-size actuators which operate in synchronism may be additionally arranged in vicinity of the first and second actuators in the embodiment shown in FIG. 6, so that the barrel is supported at five supporting points. Alternatively, two actuators may be additionally arranged on the first side surface 204 in the embodiment shown in FIG. 13, so that the barrel is supported at four supporting points.

In both the embodiment in which the barrel is supported at three supporting points and that in which the barrel is supported at four or more supporting points, it is desirable that at least two of the supporting points are basically those by the acting portions of the actuators and the acting portions of the two actuators forming these two supporting points are substantially symmetrically arranged with respect to a specified axis passing the gravity point of the barrel, so that substantially equal driving forces are produced by the two actuators to drive the barrel for shake correction. With such a construction, since the acting portions of the two actuators can be substantially symmetrically arranged with respect to the specified axis passing the gravity point so that the substantially equal driving forces are produced to drive the barrel for shake correction, the loads of the actuators are equalized and a driving system having a high dynamic symmetry can be built.

(2) Although the stepping motors are used as the actuators in the foregoing embodiments, various other actuators are applicable. For example, actuators using moving coils, those using a combination of a small-size motor and a gear mechanism or a ball screw mechanism, or those using a piezoelectric element (impact piezoelectric actuators, etc.) can also be used. These various types of actuators may be combined or biasing springs such as tensile springs, compression springs, leaf springs or spring washers may be additionally used.

(3) Although the driving forces are directly given to the acting portions of the barrel from the actuators (driving force is directly given from the nut 33A of the first actuator 3A to the first acting portion 27A in the case of FIG. 6) in the foregoing embodiments, they may be indirectly given via torque transmission mechanisms such as worms.

(4) Position detecting sensors may be provided in the barrel and the supporting plate in order to perform a shake correction control by detecting the position of the barrel driven by the actuators or to center the barrel. Optical sensors such as photointerrupters, magnetic sensors such as two-dimensional Hall sensors, semiconductor position detecting elements such as PSDs (position sensitive detectors) and like sensors may be used as such position detecting sensors.

As described above, a barrel unit is provided with a barrel including a built-in photographing optical system having an image sensing device; a supporting member for pivotally supporting the barrel, driving forces being given to the barrel for shake correction; at least two actuators for giving the driving forces to specified acting portions of the barrel from different positions; and one pivot bearing portion provided between the supporting member and the barrel. The gravity point of the barrel is located within an area enclosed by the acting portions of the at least two actuators and the pivot bearing portion.

With this construction, the barrel is rotated (shake correction) by the at least two actuators with the pivot bearing portion as a center of rotation. Since the gravity point of the barrel is located within the area enclosed by the acting portions of the at least two actuators and the pivot bearing portion, loads of the respective actuators are distributed. Thus, there is no likelihood of exerting a large load on one of the actuators. Therefore, the barrel can be driven for shake correction using two actuators having similar driving performances. Further, the barrel unit can be constructed using two actuators having a relatively smaller output. Since the smaller actuators can be used, the barrel unit can be made smaller and produced at a lower cost.

Another barrel unit is provided with a barrel including a built-in photographing optical system having an image sensing device; a supporting member for pivotally supporting the barrel, driving forces being given to the barrel for shake correction; and at least three actuators for giving the driving forces to specified acting portions of the barrel from different positions. The gravity point of the barrel is located within an area enclosed by the three actuators.

With this construction, the barrel is rotated (shake correction) by the at least three actuators about an axis passing a center of rotation determined by the arrangement of the at least three actuators. Since the gravity point of the barrel is located within the area enclosed by the acting portions of the at least three actuators, loads of the respective actuators are distributed. Thus, there is no likelihood of exerting a large load on a specific actuator. Therefore, the barrel can be driven for shake correction using three actuators having similar driving performances. Further, the barrel unit can be constructed using three actuators having a relatively smaller output. Since the smaller actuators can be used, the barrel unit can be made smaller and produced at a lower cost. Furthermore, since the barrel is driven by the three actuators, the respective loads of the actuators are reduced, which enables the further miniaturization of the actuators and the driving at a higher speed.

It may be preferable that the optical system is adapted for bending an optical axis of an incident light substantially at 90 degrees; the actuators are linear actuators for producing linear driving forces; and the driving forces of the actuators are given to the acting portions of the barrel along a direction of the optical axis of the incident light. With this construction, the barrel is driven for shake correction with the center point determined by the arrangement of the two actuators and the pivot bearing portion or the three actuators as a center of rotation upon receiving the driving forces of the linear actuators. Since a compact barrel unit can be constructed using the barrel and the linear actuators, it can contribute to the miniaturization of the image pickup apparatus having the built-in barrel in which apparatus a part of the barrel does not project out from an apparatus main body at the time of zooming.

If an attachment movable according to a pivotal movement of the barrel is connected with the barrel, the gravity point of the barrel may be preferably set at a position in consideration of the influence of a biasing force given by the attachment. If an image sensing device is built in the barrel, a flexible cable (attachment) for electrically connecting the image sensing device and an image pickup apparatus main body is attached to the barrel. Such a flexible cable is connected with the barrel while being bent in a specified manner so as to permit a pivotal movement of the barrel. By taking such a connecting mode, a biasing force comes to be given to the barrel in pushing or pulling direction. If such a biasing force acts on the barrel, the gravity point of the barrel does not simply act as a gravity point in terms of weight. Accordingly, by determining the positions of the pivot bearing portion and the acting portions of the actuators so as to enclose the gravity point considering the influence of the biasing force, the barrel can be driven for shake correction in consideration of the substantial gravity point at the time of an actual pivotal movement. In view of an actual situation where an attachment such as a flexible cable is connected, the barrel can be driven for shake correction in consideration of the substantial gravity point at the time of an actual pivotal movement. Therefore, the barrel can be more properly driven for shake correction.

Preferably, an area enclosed by the acting portions of the two actuators and the pivot bearing portion or an area enclosed by the acting portions of the three actuators may be a three-dimensional space extending in barrel driving directions by the actuators. In the case of setting the area enclosing the gravity point of the barrel, it is, in fact, difficult in some cases due to a design limitation to locate the gravity point of the barrel within a two-dimensional area enclosed by the acting portions of the two actuators and the pivot bearing portion or a two-dimensional area enclosed by the acting portions of the three actuators. On the other hand, the influence of a slight displacement of the gravity point of the barrel from the two-dimensional area is small. Accordingly, the area enclosing the gravity point of barrel may be set to a three-dimensional space extending in the barrel driving directions (optical axis direction in the case of driving the barrel in the direction of the optical axis of the incident light) by the actuators based on the two-dimensional area. Therefore, the acting portions of the actuators and the pivot bearing portion can be arranged in view of a design limitation and the like.

Preferably, the positions of the acting portions of the actuators and that of the pivot bearing portion may be set such that the gravity point of the barrel coincides with or is proximate to an area enclosed by the acting portions of the two actuators and the pivot bearing portion or an area enclosed by the acting portions of the three actuators. With this construction, since the gravity point of the barrel is located near the center (gravity point) of the triangular area enclosing the gravity point of the barrel, the loads of the actuators can be more distributed (equalized). Therefore, the barrel unit can be constructed using even smaller actuators.

It may be preferable that the barrel has a first side surface relatively close to the gravity point of the barrel; a second side surface opposed to the first side surface and relatively distant from the gravity point; a first inertia principle axis passing the gravity point of the barrel and orthogonal to an optical axis of an incident light introduced to the barrel and having a relatively large inertia thereabout; a second inertia principle axis passing the gravity point of the barrel and orthogonal to the optical axis and having an inertia thereabout relatively smaller than the first inertia principle axis; a third inertia optical axis passing the gravity point of the barrel and parallel with the optical axis; and the first, second, and third inertia principle axes orthogonally intersecting one another. In this case, it may be preferable that the first and second side surfaces are parallel with a direction of the second inertia principle axis, the pivot bearing portion is arranged on the first inertia principle axis and on the first side surface, the acting portions of the two actuators are arranged at symmetric positions on the second surface with respect to the first inertia principle axis, and the linear driving forces are given to the acting portions of the barrel along a direction of the third inertia principle axis by the two actuators.

With this construction, inertial loads exerted on the two actuators can be made even smaller upon driving the barrel. Particularly, if the two actuators are arranged at positions most distant from the first inertia principle axis, the respective inertial loads of the actuators can be minimized. Further, since the construction has a high dynamic symmetry although the pivot bearing portion is arranged on the outer part of the barrel, the barrel can be stably driven for shake correction. Therefore, an optimal construction in which the inertial loads of the actuators are smaller and the barrel can be stably driven for shake correction can be provided in the case of supporting the barrel by the two actuators and one pivot bearing portion.

It may be preferable that the barrel has a first side surface relatively close to the gravity point of the barrel; a second side surface opposed to the first side surface and relatively distant from the gravity point; a first inertia principle axis passing the gravity point of the barrel and orthogonal to an optical axis of an incident light introduced to the barrel and having a relatively large inertia thereabout; a second inertia principle axis passing the gravity point of the barrel and orthogonal to the optical axis and having an inertia thereabout relatively smaller than the first inertia principle axis; a third inertia principle axis passing the gravity point of the barrel and parallel with the optical axis; and the first, second, third inertia principle axes orthogonally intersecting one another. In this case, it may be preferable that the first and second side surfaces are parallel with a direction of the second inertia principle axis, the acting portion of the first actuator is arranged on the first inertia principle axis and on the first side surface, the acting portions of the second and third actuators are arranged at symmetric positions on the second surface with respect to the first inertia principle axis, and the linear driving forces are given to the acting portions of the barrel along a direction of the third inertia principle axis by the three actuators.

With this construction, inertial loads exerted on the three actuators can be made even smaller upon driving the barrel. Particularly, if the second and third actuators are arranged at positions most distant from the first inertia principle axis, the inertial loads of these actuators can be minimized. Further, since the construction has a high dynamic symmetry, the barrel can be stably driven for shake correction. Therefore, an optimal construction in which the inertial loads of the actuators are smaller and the barrel can be stably driven for shake correction can be provided in the case of supporting the barrel by the three actuators.

An image pickup apparatus comprises the above-mentioned barrel unit; a shake detector for detecting a shake amount given to an image pickup apparatus main body having the barrel unit mounted therein; and shake correction controller for generating shake correction drive signals for the actuators provided in the barrel unit in accordance with the shake amount detected by the shake detector. Accordingly, there can be provided an image pickup apparatus capable of driving the barrel for shake correction against a camera shake or the like. The image pickup apparatus provided with the shake correcting function can be miniaturized since having the compact barrel unit capable of performing a shake correction.

A method for correcting a shake of a barrel provided with a photographing optical system including an image sensing device, comprises the steps of supporting the barrel at three or more supporting points, at least two of the supporting points being given by acting portions of actuators; and giving driving forces to the barrel from the at least two supporting points to correct a shake. The three or more supporting points are arranged at such positions as to enclose the gravity point of the barrel. The acting portions of the actuators are substantially symmetrically arranged with respect to a predetermined axis passing the gravity point. The two actuators are caused to generate substantially equal driving forces to drive the barrel for shake correction. According to this method, the loads of the actuators are equalized and a driving system having a high dynamic symmetry can be built since the acting portions of the two actuators are substantially symmetrically arranged with respect to the specified axis passing the gravity point and the substantially equal driving forces are generated to drive the barrel for shake correction. Therefore, smaller actuators can be used and the barrel can be stably driven for shake correction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A barrel unit comprising:
   a barrel including a photographing optical system having an image sensing device;
   a supporting member for pivotally supporting the barrel;
   at least two actuators for providing driving forces to specified acting portions of the barrel from different positions for shake correction; and
   a pivot bearing portion provided between the supporting member and the barrel, and configured to provide a common supporting point for rotation of the barrel along two intersecting axes;
   wherein a gravity point of the barrel is located within an area enclosed by the acting portions of the at least two actuators and the pivot bearing portion; and
   wherein the barrel further includes:
      a first side surface relatively close to the gravity point of the barrel;
      a second side surface opposed to the first side surface and relatively distant from the gravity point;
      a first inertia principle axis passing the gravity point of the barrel, and orthogonal to an optical axis of an incident light introduced to the barrel and having a relatively large inertia thereabout;
      a second inertia principle axis passing the gravity point of the barrel, and orthogonal to the optical axis and having an inertia thereabout relatively smaller than the first inertia principle axis;
      a third inertia principle axis passing the gravity point of the barrel, and parallel with the optical axis; and
      the first, second, and third inertia principle axes orthogonally intersecting-one another, wherein the first and second side surfaces are parallel with a direction of the second inertia principle axis, the pivot bearing portion is arranged on the first inertia principle axis and on the first side surface, the acting portions of the two actuators are arranged at symmetric positions on the second surface with respect to the first inertia principle axis, and the linear driving forces are provided to the acting portions of the barrel along a direction of the third inertia principle axis by the two actuators.

2. A barrel unit according to claim 1, wherein the optical system is adapted for bending an optical axis of incident light substantially at 90 degrees, the actuators are linear actuators configured to produce linear driving forces provided to the acting portions of the barrel along a direction of the optical axis of the incident light.

3. A barrel unit according to claim 1, wherein, in a case that an attachment movable according to a pivotal movement of the barrel is connected with the barrel, the gravity point of the barrel is set at a position in consideration of the influence of a biasing force given by the attachment.

4. A barrel unit according to claim 1, wherein an area enclosed by the acting portions of the at least two actuators and the pivot bearing portion is a three-dimensional space extending in barrel driving directions by the actuators.

5. A barrel unit according to claim 1, wherein the positions of the acting portions of the actuators and that of the pivot bearing portion are set such that the gravity point of the barrel coincides with or is proximate to an area enclosed by the acting portions of the at least two actuators and the pivot bearing portion.

6. A barrel unit comprising:
   a barrel including a photographing optical system having an image sensing device;
   a supporting member for pivotally supporting the barrel;
   at least three actuators configured to provide driving forces to specified acting portions of the barrel from different positions for shake correction;
   wherein the actuators are linear actuators provide a linear driving force;
   the driving force of the actuators are provided to an acting portion of the barrel along a direction of an optical axis of incident light;
   wherein to provide shake correction, two of the three actuators are configured to produce driving forces in same direction or wherein two of the three actuators are configured to produce driving forces in different directions from each other; and
   wherein a gravity point of the barrel is located within an area enclosed by the at least three actuators, and wherein the barrel includes:
      a first side surface relatively close to the gravity point of the barrel;
      a second side surface opposed to the first side surface and relatively distant from the gravity point;
      a first inertia principle axis passing the gravity point of the barrel, and orthogonal to an optical axis of an incident light introduced to the barrel and having a relatively large inertia thereabout;
      a second inertia principle axis passing the gravity point of the barrel, and orthogonal to the optical axis and having an inertia thereabout relatively smaller than the first inertia principle axis;
      a third inertia principle axis passing the gravity point of the barrel, and parallel with the optical axis; and
      the first, second, and third inertia principle axes orthogonally intersecting one another, wherein the first and second side surfaces are parallel with a direction of the second inertia principle axis, the acting portion of the first actuator is arranged on the first inertia principle axis and on the first side surface, the acting portions of the second and third actuators are arranged at symmetric positions on the second surface with respect to the first inertia principle axis, and the linear driving forces are provided to the acting portions of the barrel along a direction of the third inertia principle axis by the three actuators.

7. A barrel unit according to claim 6, wherein the optical system is adapted for bending an optical axis of incident light substantially at 90 degrees, the actuators are linear actuators are configured to produce linear driving forces provided to the acting portions of the barrel along a direction of the optical axis of the incident light.

8. A barrel unit according to claim 6, wherein, in a case that an attachment movable according to a pivotal movement of the barrel is connected with the barrel, the gravity point of the barrel is set at a position in consideration of the influence of a biasing force given by the attachment.

9. A barrel unit according to claim 6, wherein an area enclosed by the acting portions of the at least three actuators is a three-dimensional space extending in barrel driving directions by the actuators.

10. A barrel unit according to claim 6, wherein the positions of the acting portions of the at least three actuators are set such that the gravity point of the barrel coincides with or is proximate to an area enclosed by the acting portions of the at least three actuators.

* * * * *

UNITED STATES PATENT AND TRADEMARK OFFICE
CERTIFICATE OF CORRECTION

PATENT NO. : 7,519,283 B2　　　　　　　　　　　　　　　　　　　　　　Page 1 of 1
APPLICATION NO. : 11/358290
DATED : April 14, 2009
INVENTOR(S) : Hiroshi Mashima et al.

It is certified that error appears in the above-identified patent and that said Letters Patent is hereby corrected as shown below:

<u>On the Title Page</u>

Item (75), replace "Sakai" with --Osaka-- (all occurrences).

<u>In the Claims</u>

In column 21, claim 1, line 46, replace "intersecting-one" with --intersecting one--.

In column 22, claim 6, line 18, after "are linear actuators" insert --to--.

Signed and Sealed this

Seventeenth Day of November, 2009

David J. Kappos
*Director of the United States Patent and Trademark Office*